United States Patent [19]
Kurashima et al.

[11] Patent Number: 5,596,665
[45] Date of Patent: Jan. 21, 1997

[54] OPTICAL MODULE HAVING STRUCTURE FOR DEFINING FIXING POSITION OF SLEEVE

[75] Inventors: Hiromi Kurashima; Hisato Takahashi; Ken-ichi Kitayama; Ryoji Sakamoto; Sosaku Sawada; Takeshi Sekiguchi; Ichiro Tonai; Nobuo Shiga, all of Yokohama, Japan

[73] Assignee: Sumitomo Electric Industries, Ltd., Osaka, Japan

[21] Appl. No.: 551,270

[22] Filed: Oct. 31, 1995

[30] Foreign Application Priority Data

Oct. 31, 1994 [JP] Japan .................................. 6-267391
Nov. 9, 1994 [JP] Japan .................................. 6-275094
Feb. 7, 1995 [JP] Japan .................................. 7-019250

[51] Int. Cl.$^6$ ........................................ G02B 6/42
[52] U.S. Cl. .......................... 385/92; 385/88; 385/89; 385/94
[58] Field of Search ........................... 385/88, 89, 90, 385/91, 92, 93, 94, 78

[56] References Cited

U.S. PATENT DOCUMENTS

| | | | |
|---|---|---|---|
| 4,410,469 | 10/1983 | Katagiri et al. | 264/1.25 |
| 4,539,476 | 9/1985 | Donuma et al. | 385/93 X |
| 4,547,039 | 10/1985 | Caron et al. | 385/88 |
| 4,979,787 | 12/1990 | Lichtenberger | 385/88 |
| 5,117,476 | 5/1992 | Yingat et al. | 385/88 |
| 5,222,170 | 6/1993 | Barger et al. | 385/88 |
| 5,231,685 | 7/1993 | Hanzawa et al. | 385/84 |
| 5,307,435 | 4/1994 | Chihara | 385/92 |
| 5,321,686 | 6/1994 | Rabinovich | 385/93 |
| 5,353,364 | 10/1994 | Kurashima | 385/88 |
| 5,361,318 | 11/1994 | Go et al. | 385/89 |
| 5,379,362 | 1/1995 | Kawamura | 385/92 |
| 5,416,871 | 5/1995 | Takahashi et al. | 385/88 |
| 5,432,391 | 9/1995 | Chou et al. | 385/92 |

FOREIGN PATENT DOCUMENTS 2-126107 10/1990 Japan .

OTHER PUBLICATIONS

Abstract From Fiber Optics, 9431, p. 86, citing EP 600645-A1, Aug. 9, 1994.

*Primary Examiner*—Rodney B. Bovernick
*Assistant Examiner*—Hemang Sanghavi
*Attorney, Agent, or Firm*—Cushman Darby & Cushman IP Group of Pillsbury Madison & Sutro LLP

[57] ABSTRACT

It is an object of the present invention to provide an optical module having a structure in which alignment precision of sleeves to be accommodated to a housing can be improved with a simple operation. The optical module according to the present invention is characterized by providing special structures for defining the positions of the sleeves to a sleeve holder for holding the sleeves, and the housing having a cavity for accommodating the sleeves. In particular, the housing includes support portions each having a reference surface for defining the fixing position of the corresponding sleeve. The sleeve holder includes spring pieces each for urging the sleeve to the reference surface.

16 Claims, 27 Drawing Sheets

OPTICAL MODULE HAVING STRUCTURE FOR DEFINING FIXING POSITION OF SLEEVE

BACKGROUND OF THE INVENTION

1. Field of the Invention

The present invention relates to an optical module used for an optical communication system such as an optical local area network (LAN) or an optical data link using light as an information transmission medium.

2. Related Background Art

Japanese Patent Laid-Open No. 2-271308 discloses a conventional optical module. This conventional optical module comprises a cylindrical sleeve. The sleeve consists of a metal such as stainless steel. One end of the sleeve has an opening for accommodating an optical operation element. The other end of the sleeve also has an opening capable of accommodating at least a part of an optical fiber positioning ferrule arranged at the distal end of a connector plug. The optical operation element is fixed in this sleeve with an adhesive or the like. The outer wall of the sleeve has a flange for fixing the sleeve itself.

The conventional optical module further includes a package body for supporting a circuit board. A support plate for fixing a sleeve is fixed in the package body with an adhesive or the like. The flange of the sleeve in which the optical operation element is mounted is adhered and fixed to the support plate. Terminals extending from the bottom portion of the optical operation element are electrically connected to a constituent element (an electronic component such as resistor, a bare chip IC, etc.) of the circuit board mounted on the package main body. An electrical signal output from this electronic circuit is extracted outside the optical module through a plurality of lead pins.

Japanese Patent Laid-Open No. 4-165312 discloses a structure for fixing a sleeve. In this reference, the outer wall of the sleeve has a flange for fixing the sleeve itself. The flange is clamped between a sleeve holder and a plate having a special shape, and the sleeve holder and the plate are fixed with rivets, so that the sleeve is firmly fixed to only the sleeve holder. In addition, the sleeve holder to which the sleeve is fixed with the plate and the rivets is fixed to a housing for accommodating the entire sleeve.

SUMMARY OF THE INVENTION

The inventors discovered the following undesirable structures of the conventional optical module. In order to fix the sleeve at a predetermined position in the housing, before the sleeve is accommodated into the housing of the conventional optical module, the sleeve must fixed to the sleeve holder or the package body having the circuit board thereon, using the adhesive or rivets, so it is difficult to improve working efficiency in the assembly. In other words, components constituting the optical module are fixed to the sleeve and, thereafter the components fixed to the sleeve are combined with a housing to manufacture the conventional optical module. The mounting position of the sleeve in the housing depends on the fixing precision between the sleeve and the components and the assembly precision between the components and the housing. In particular, in mounting a plurality of sleeves in one housing, the alignment precision of the respective sleeves may vary.

It is an object of the present invention to provide an optical module having a structure in which alignment precision of sleeves can be improved with a simple operation.

According to the optical module of the present invention, when the constituent components are assembled, the mounting position of the sleeve in the housing is automatically determined. Therefore, the sleeve can be precisely accommodated at a predetermined position in the housing.

In order to achieve the above object, as shown in FIGS. 1, 2, and 15, and the like, an optical module according to the present invention comprises an optical fiber positioning ferrule 9a arranged at the distal end of a connector plug 9, a sleeve 5 (6) for accommodating an optical operation element 2 (3) such as a semiconductor laser or a photodiode and optically positioning between the optical operation element and an end of the optical fiber, a circuit board 8 electrically and physically connected to the optical operation element 2 (3) adhered and fixed to the sleeve 5 (6), a housing 4 having a cavity for accommodating the entire sleeve 5 (6) mounted on the circuit board 8, the housing having a support portion 31 (32) projecting from an inner wall of the housing in order to position the sleeve 5 (6) at a predetermined position in the cavity, and a sleeve holder 7 cooperating with the housing 4 to fix the sleeve 5 (6) at the predetermined position in the cavity.

The sleeve 5 (6) comprises a ferrule holding portion 10 (first holding portion) having a first insertion hole (ferrule insertion hole) 10a capable of accommodating at least a part of the optical fiber positioning ferrule 9a arranged at the distal end of an optical fiber, an element holding portion 11 (second holding portion) arranged to oppose the ferrule holding portion 10 and having a second insertion hole 11a in which the optical operation element 2 (3) is accommodated, and a flange 12 formed on an outer wall of the sleeve 5 (6) between the ferrule holding portion 10 and the element holding portion 11, the flange having first and second surfaces 12a and 12b opposing each other. The first surface 12a is located on the element holding portion side of the sleeve 5 (6), while the second surface 12b is located on the ferrule holding portion side of the sleeve 5 (6).

As shown in FIGS. 2 and 3, the circuit board 8 has a flexible printed circuit 46 on a base plate 45, the flexible printed circuit 46 being electrically connected to terminals 2a (3a) extending from a bottom surface of the optical operation element 2 (3). At the same time, the circuit board 8 holds the sleeve 5 (6). In particular, the flexible printed circuit 46 comprises a main body 46a (reinforced with the base plate 45) on which part of the electronic circuit is mounted, a head portion 46b (46d) directly connected to each of the terminals 2a (3a) of the optical operation element 2 (3), and a neck portion 46c (46e) for coupling the main body 46a to the head portion 46b (46d). The head portion 46b (46d) is reinforced with an auxiliary plate 47 (48). The base plate 45 and the reinforcing plate 47 (48) are spaced apart from each other by a predetermined distance and adhered to the rear surface of the flexible printed circuit 46.

As shown in FIGS. 5 and 7, the support portion 31 (32) of the housing 4 projects from the inner wall of the housing 4 into the cavity. The support portion 31 (32) has a first reference surface 31a (32a) which abuts against at least the first surface 12a of the flange 12 of the sleeve 5 (6).

As shown in FIGS. 2 and 6, the sleeve holder 7 (attached at the opening portion of the housing 4 in cooperation with the housing 4 to accommodate the sleeve 5 (6) at the predetermined position in the cavity of the housing 4) comprises first spring pieces 24A and 24B (25A and 25B) which abut against the second surface 12b of the flange 12 of the sleeve 5 (6) to urge the first surface 12a of the flange 12 of the sleeve 5 (6) against the first reference surface 31a (32a). In particular, projections 24a (25a) formed on the spring pieces 24A and 24B (25A and 25B) directly contact the second surface 12b of the corresponding flange 12.

A spring piece 35 (36) (third spring piece) is further disposed on the inner wall of the housing 4. The spring piece 35 (36) has a projection 35a (36a) abutting against the second surface 12b of the corresponding flange 12 to urge the first surface 12a of the flange 12 of the sleeve 5 (6) against the first reference surface 31a (32a).

With the above arrangement, the mounting position of the sleeve 5 (6) in the ferrule insertion direction (i.e., a direction corresponding to an arrow F in FIG. 1) can be properly defined.

In addition, as shown in FIGS. 5 and 7, the support portion 31 (32) of the housing 4 has a second reference surface 37a (38a) for defining the fixing position of the sleeve 5 (6). As shown in FIGS. 2 and 8, the sleeve holder 7 has a second spring piece 26 (27) for urging the sleeve 5 (6) against the second reference surface 37a (38a). In particular, at least part of the second reference surface 37a (38a) abuts against the outer wall along the outer wall of the sleeve 5 (6). With this arrangement, the mounting position of the sleeve 5 (6) in a direction perpendicular to the ferrule insertion direction can be properly defined.

The outer diameter of the flange 12 of the sleeve 5 (6) is larger than a length from the first surface 12a of the flange 12 to the distal end of the ferrule holding portion 10 (having the first insertion hole 10a of the sleeve 5 (6)) (see FIGS. 16 and 17).

To facilitate the assembly of the optical module, the sleeve holder 7 has a base portion 15 for supporting the first and second spring pieces 24A and 24B (25A and 25B) and 26 (27). The base portion 15 has first latch portions 28 at both the sides thereof. Second latch portions 40 respectively corresponding to the first latch portions 28 are formed on the side walls of the housing 4. Each second latch portion 40 is engaged with a corresponding one of the first latch portions 28. With this arrangement, the sleeve holder 7 can easily be attached at the opening portion of the housing 4.

Similarly, to attach the circuit board 8 at the opening portion of the housing 4, the housing 4 further comprises a board support portion 42 for defining the fixing position of the circuit board 8 in the cavity and hook pieces 41a for mounting the circuit board 8 in the opening portion of the housing 4.

The optical sleeve applied to the optical module must strictly optically couple the ferrule inserted from one end portion to the optical operation element adhered and fixed to the other end portion. For this reason, a high mechanical precision and strength are required for the optical sleeve. While demand has arisen for low-cost sleeves in mass production, plastic molding techniques have been recently improved. Under these circumstances, plastic materials have been attempted to be used to form optical sleeves.

According to new findings of the present inventors, when a plastic sleeve is used in the optical module, a function of reducing external noise, i.e., a function of reducing an antenna effect is obtained without applying a special structure to the optical module.

A sleeve simply manufactured by a conventional plastic molding technique has poor manufacturing precision. For this reason, upon plastic molding, the sleeve cannot be used for the optical module without performing secondary forming such as cutting of the surface of the resultant sleeve. The present inventors obtained a high-quality sleeve (having high manufacturing precision without performing any secondary forming) using a kind of total aromatic polyester of grade number A150B called a liquid crystal polymer, available from Polyplastics Co, Ltd. as the material of the sleeve.

A photo-setting resin is generally used as an adhesive to fix an optical operation element to a sleeve. When working efficiency is particularly taken into consideration, it takes a long period of time to fix the optical operation element to a plastic sleeve as compared with a conventional stainless steel sleeve. When the setting time of the adhesive is prolonged, the assembly efficiency of the optical module is degraded accordingly. In the use of a plastic sleeve, a metal film such as a nickel film is effectively formed in the second insertion hole into which the optical operation element is mounted. The nickel film used as a reflection film functions so as to effectively propagating UV light to a bottom of the element insertion hole 11a through the adhesive between the inner wall of the second insertion hole and the casing of the optical operation element, and thereby the UV light sufficiently hardens the adhesive in the gap.

When positioning precision of the optical operation element to be mounted in the sleeve is taken into consideration, it is preferable to form a smaller gap between the inner wall of the second insertion hole and the casing of the optical operation element. However, when the gap is excessively reduced, the gap can not be irradiated with the UV light. It is preferable that a plurality of grooves be formed in the inner wall of the second insertion hole to assure a space through which light can propagates. In other words, the plurality of grooves function so as to secure the space through which light can propagets while becoming narrow the gap betwwen the optical operation element and the sleeve.

In the optical module of the present invention, when the sleeve holder is attached to the housing, the flange formed on the outer surface of each sleeve is clamped and supported between the corresponding support portion formed in the housing and the corresponding spring pieces formed in the sleeve holder. The trunk portion (particularly, the element holding portion) of each sleeve is clamped and supported between the support portion of the housing and another spring piece of the sleeve holder. The surface of the support portion of the housing which is in contact with the sleeve serves as a reference surface, so that the sleeve can be accurately mounted at the predetermined position in the housing.

When a plastic sleeve is applied to the optical module, the antenna effect can be greatly reduced. When a metal film is formed on the inner surface of the element holding portion to which the optical operation element is adhered and fixed, resin setting light irradiated from the rear side of the sleeve to the portion (filled with an adhesive such as an ultraviolet-curing resin) between the element holding portion and the metal film propagates in a zig-zag manner (see FIG. 24). Since the outer surface of the optical operation element and the inner wall of the element holding portion of the sleeve are metal surfaces, the irradiated light can be mirror-reflected on the respective surfaces, and the losses on the reflecting surfaces are very small (no absorption by the sleeve material). Therefore, the light irradiated from the rear side of the sleeve can reach the distal end portion of the resin filled in the gap between the optical operation element and the metal film while maintaining a sufficiently high intensity, thereby immediately setting the resin as a whole.

When corrugations are formed on at least one of the element holding portion of the sleeve and the outer surface of the optical operation element; regardless of the sleeve material, the adhesive filled in the recesses has a large thickness. In this manner, since UV light becomes to easily propagate through the recesses, a sufficiently high adhesion strength can thus be obtained between the sleeve and the optical operation element.

In addition, the thick adhesive portions constitute part of the entire adhesive layer, the total amount of adhesive does not prolong the setting time.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

Figure 1:
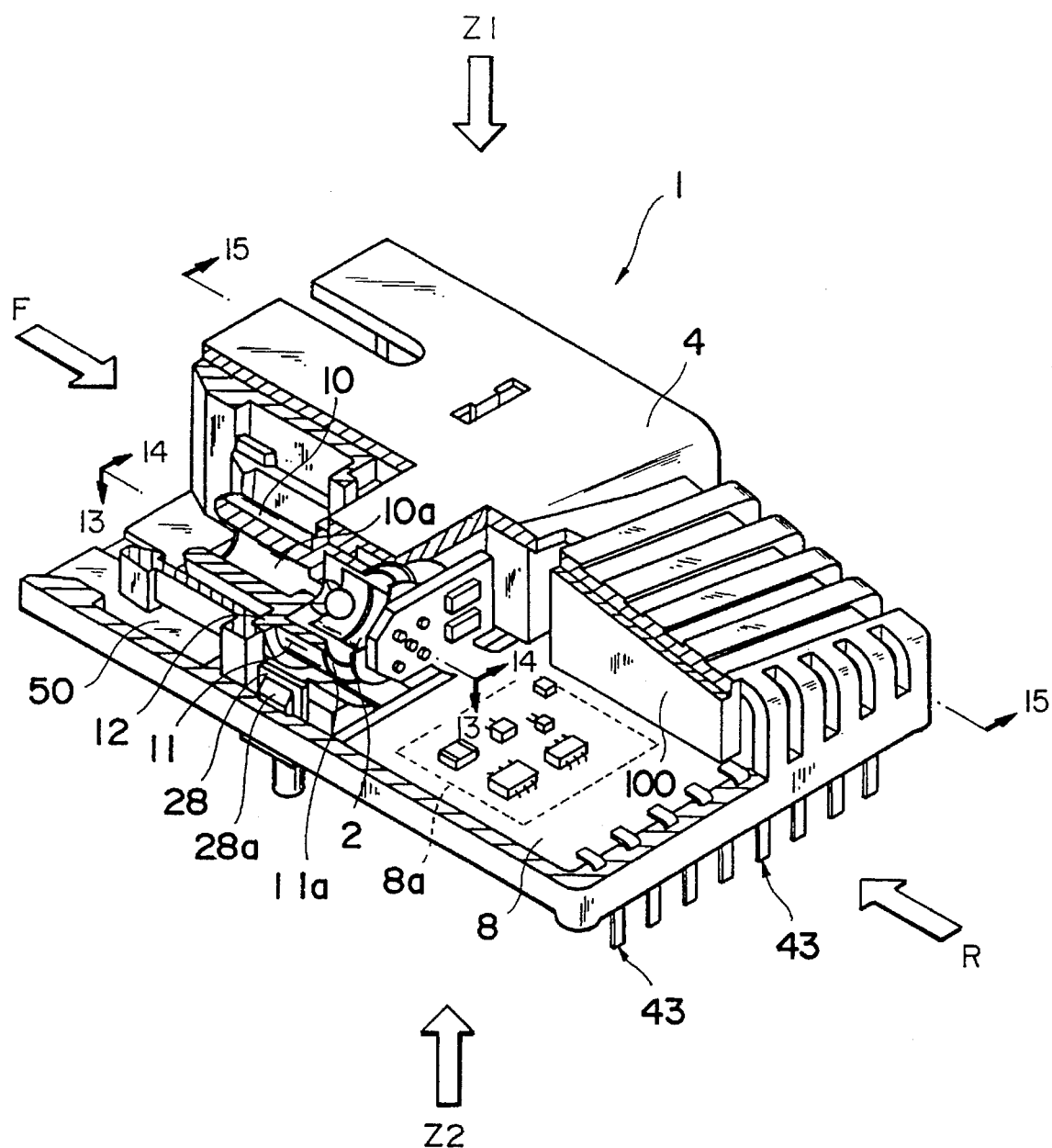
FIG. 1 is a partial sectional view for explaining the structure of an optical module according to the present invention.
Figure 2:
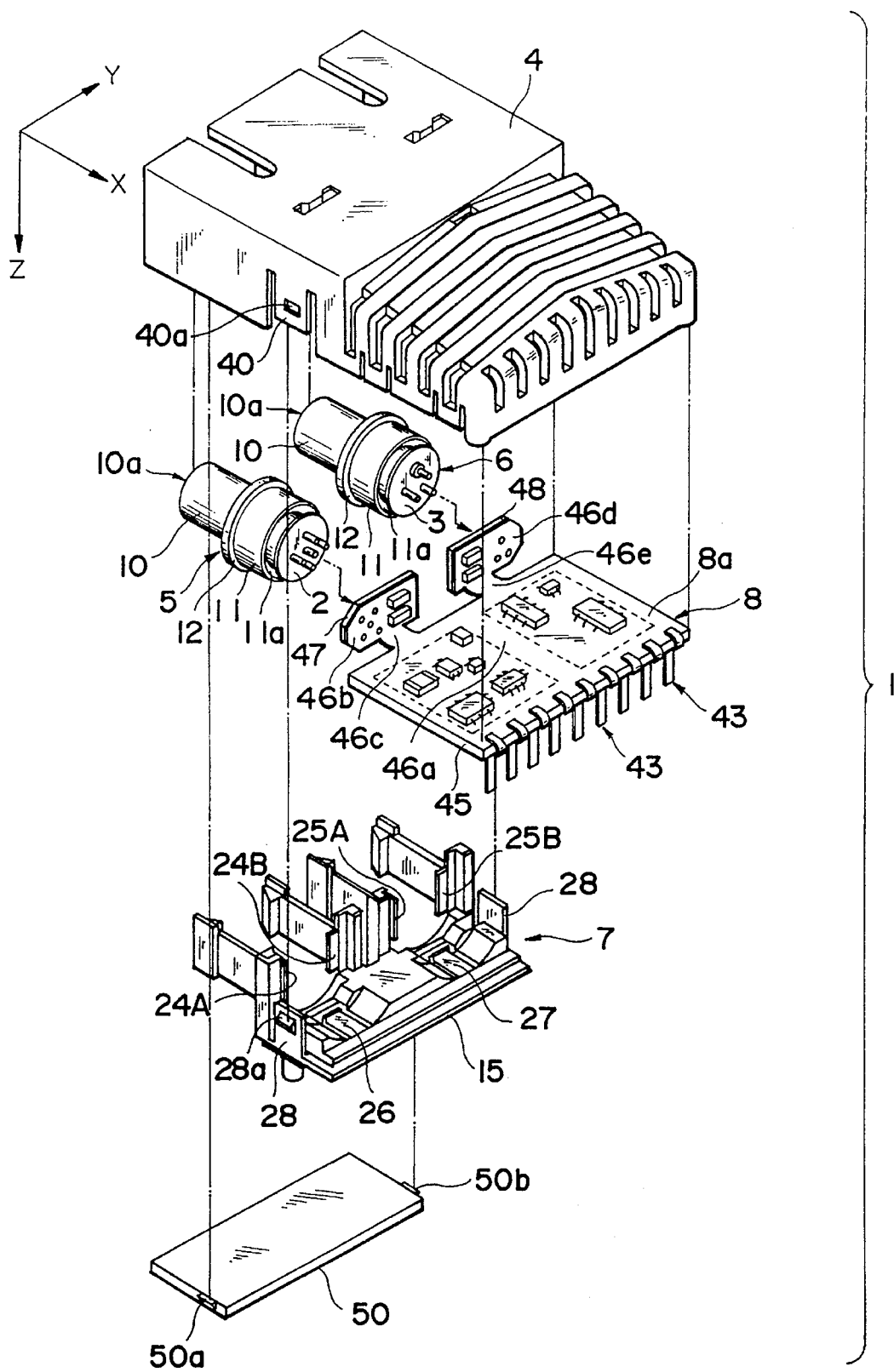
FIG. 2 is a perspective view for explaining the assembly process of the optical module according to the present invention.

Referring to FIGS. 1 and 2, reference numeral denotes a transceiver optical module. This optical module 1 integrally incorporates a transmission optical operation element (e.g., a semiconductor laser or a light emitting diode) 3 and a reception optical operation element (e.g., a photodiode) 2. The optical module 1 has a housing 4 consisting of PPS (polyphenylene sulfide) and having a U-shaped section. The housing 4 incorporates resin sleeves 5 and 6 which hold the optical operation elements 2 and 3, a resin sleeve holder 7 for fixing the sleeves 5 and 6 at predetermined positions, and a circuit board 8 which is electrically connected to a plurality of terminals 2a and 3a extending from the optical operation elements 2 and 3 and on which a flexible printed circuit 46 is fixed.

Particularly, FIG. 2 is a view for explaining the assembly process of the optical module 1, when viewed from the housing 4 side of the optical module 1.

The sleeves 5 and 6 to which the optical operation elements 2 and 3 are fixed by element holding portions 11 are held by electrically connecting and fixing the optical operation elements 2 and 3 to part of the circuit board 8. When the circuit board 8 is attached to the housing 4, the entire sleeves 5 and 6 are accommodated to the housing 4.

At this time, a member 100 in FIG. 1 functions to assure a cavity in the housing 4.

A kind of total aromatic polyester of grade number A150B called a liquid crystal polymer, available from Polyplastics Co, Ltd. was used as the material of the sleeve. The physical and mechanical properties of this A150B polyester are as follows.

| Property | Unit | A150B |
| --- | --- | --- |
| Specific Gravity | — | 1.77 |
| Rockwall Hardness | M scale | 69 |
| Tensile Strength (thickness: 3.2 mm) | MPa (kgf/cm$^2$) | 98 (1,000) |
| Tensile Elongation (thickness: 3.2 mm) | % | 5.5 |
| Bending Strength (thickness: 6.4 mm) | MPa (kgf/cm$^2$) | 137 (1,400) |
| Modulus of Elasticity in Bending (thickness: 3.2 mm) | Mpa (kgf/cm$^2$) | 8,800 ($9 \times 10^4$) |
| Izod Impact Strength (with notch) | J/m (kgf · cm/cm) | 49 (5) |

Injection plastic molding method is described in, for example, "mechanical characteristics of plastic" ("PURASUTIKKU NO KIKAITEKI TOKUSEI" in Japanese, author Ikuo NARUSAWA, published by Sigma publishing company, Apl. 15, 1994), "injection molding and dies manual" ("SHASYUTSU SEIKEI'KANAGATA MANYUARU" in Japanese, author AOBA, published by KOUGYOU CYOUSA KAI, Dec. 10, 1989), and the like.

First latch portions 28 extending from a base portion 15 of the sleeve holder 7 are engaged with second latch portions 40 formed on the side walls of the housing 4 to attach the sleeve holder 7 to the housing 4. More specifically, projections 28a of the first latch portions 28 are fitted in openings 40a of the second latch portions 40 to fix the sleeve holder 7.

At this time, the sleeves 5 and 6 already accommodated to the housing 4 are automatically set at predetermined positions in accordance with a special structure shown in FIGS. 7 to 14.

A protective plate 50 is attached to the housing 4 in order to cover the opening portion of the housing 4. Projections 50a and 50b are formed at both the ends of the plate 50. The projections 50a and 50b are fitted in grooves 50c and 50d formed in the inner walls of the housing 4 to fix the plate 50 to the opening portion of the housing 4.

Figure 3:
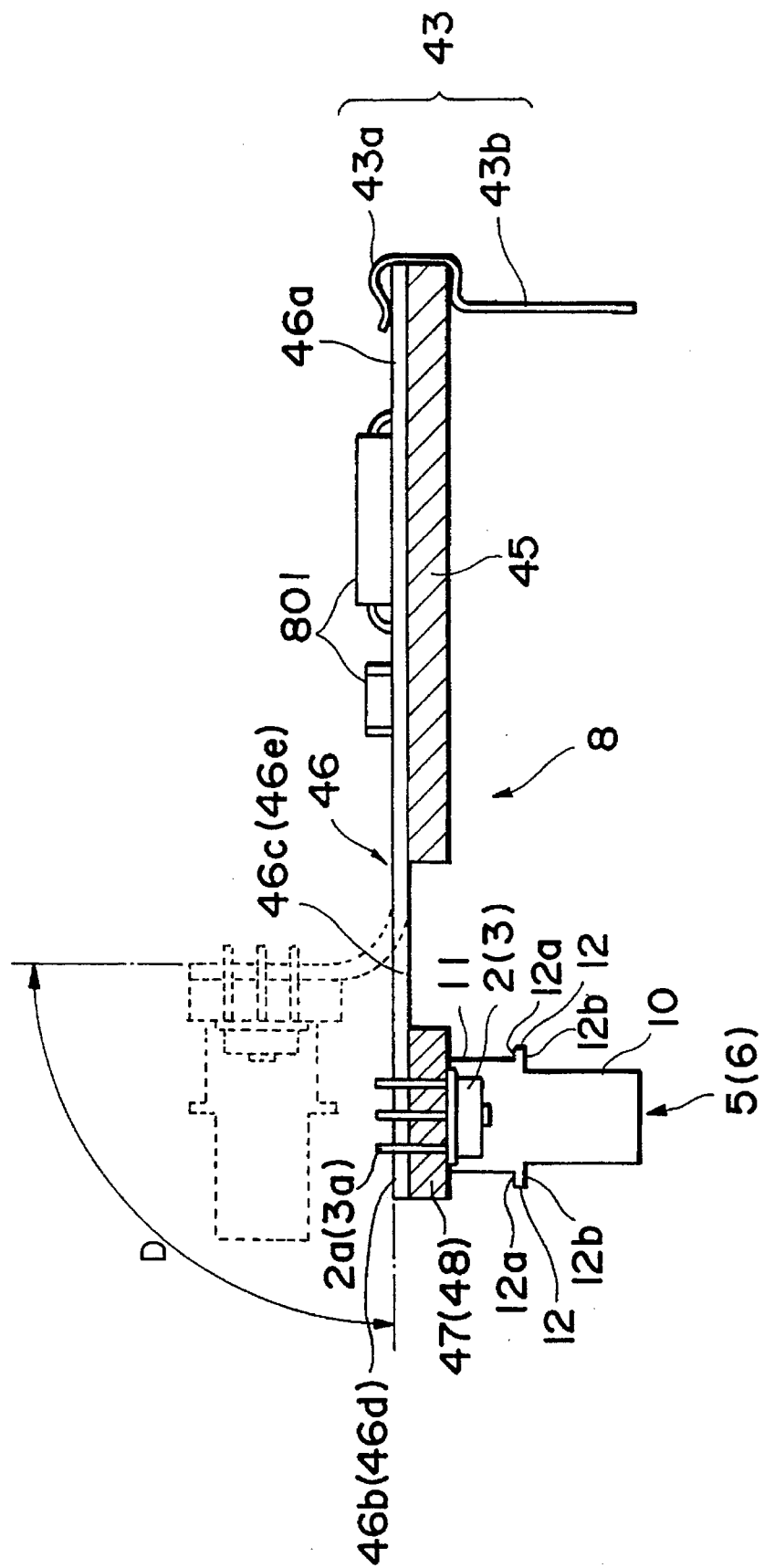
FIG. 3 is a longitudinal sectional view of a circuit board for explaining part (the assembly process between a sleeve and the circuit board) of the assembly process of the optical module according to the present invention.

The structure of the circuit board 8 will be described with reference to FIGS. 3 and 4. As shown in FIG. 3, the circuit board 8 has a flexible printed circuit (FPC) 46. The FPC 46 comprises a main body 46a on which circuit elements 801 are mounted, a head portion 46b (46d) connected to terminals 2a (3a) of the optical operation element 2 (3) adhered and fixed to the sleeve 5 (6), and a neck portion 46c (46e) coupling the main body 46a to the head portion 46b (46d). The head portion 46b (46d) has a reinforcing plate 47 (48) as a backing plate, and the main body 46 has a base plate 45 as a backing plate to obtain a desired strength. The circuit board 8 is bent at the neck portion 46c (46e) in a direction indicated by an arrow D. When the circuit board 8 is attached at the opening portion of the housing 4, each entire sleeve 5 (6) is disposed in the cavity of the housing 4.

Figure 4:
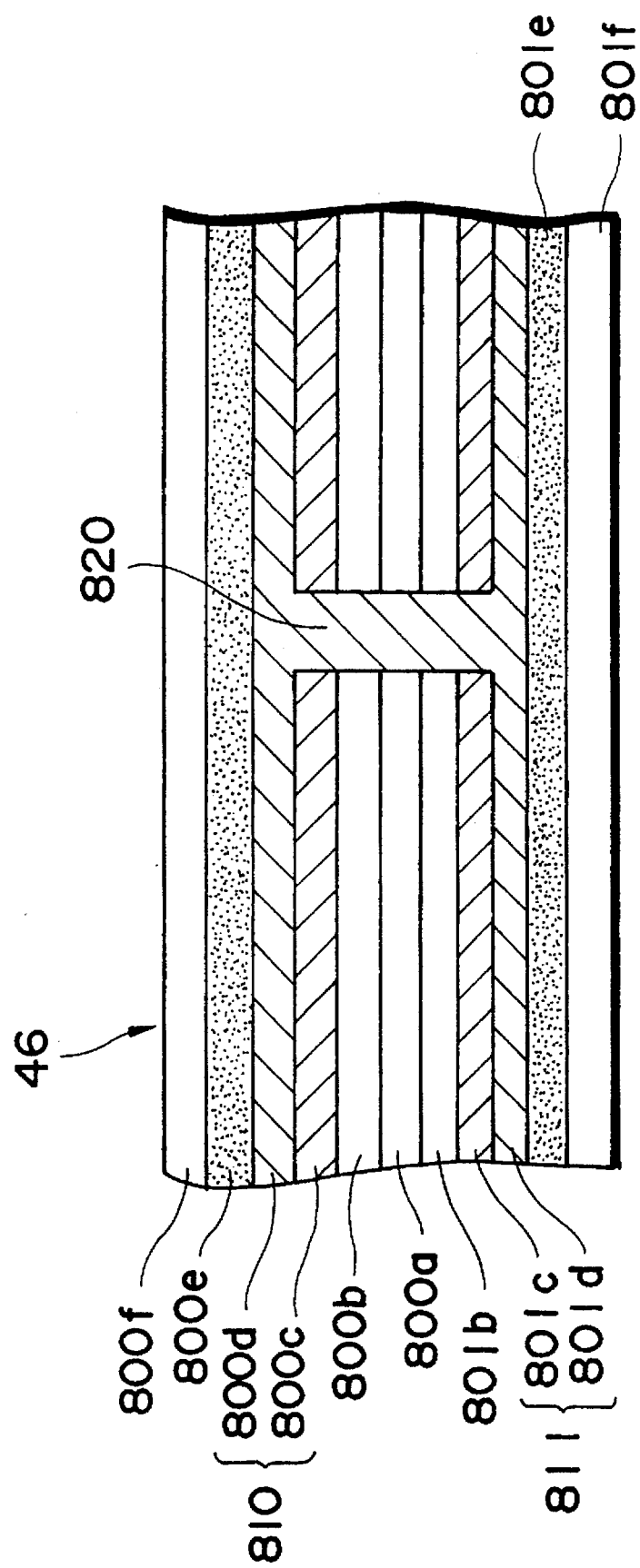
FIG. 4 is an enlarged longitudinal sectional view showing part of the circuit board shown in FIG. 3.

The sectional structure of the FPC 46 is a multilayered structure in which a plurality of metal interconnections (e.g., a signal line for transmitting an electrical signal and a ground line) are formed in different layers through an insulating layer, as shown in FIG. 4. More specifically, the FPC 46 is constituted as follows. The epoxy layer 800b (20 µm) as an adhesive layer for adhering layers, a copper layer 810 (18 µm) as a metal wiring layer, the epoxy layer 800e (20 µm) as an adhesive layer for adhering layers, and a polyimide layer 800f (25 µm) as a cover layer for the FPC are sequentially formed on one surface of the polyimide layer 800a (25 µm) as a base layer. At the same time, an epoxy layer 801b (20 µm) as an adhesive layer for adhering layers, a metal wiring layer 811 (18 µm), an epoxy layer 801e (20 µm) as an adhesive layer for adhering layers, and a polyimide layer 801f (25 µm) as a cover layer for the FPC are sequentially formed on the other surface of the polyimide layer 800a (25 µm) as the base layer. In this manner, multilayered structures vertically symmetrical about the base layer 800a are realized.

Note that the metal wiring layer 810 (811) is constituted by stacking, on the metal wiring layer 810 (811), the first copper layer 800c (801c) as a conductive layer, and the second copper layer 800d (801d) as a conductive layer for a through hole 820 as shown in FIG. 4.

The assembly process of the optical module 1 will be described with reference to FIGS. 5 and 6 viewed from a direction opposite to FIG. 2 (corresponding to an arrow Z2 in FIG. 1).

Figure 5:
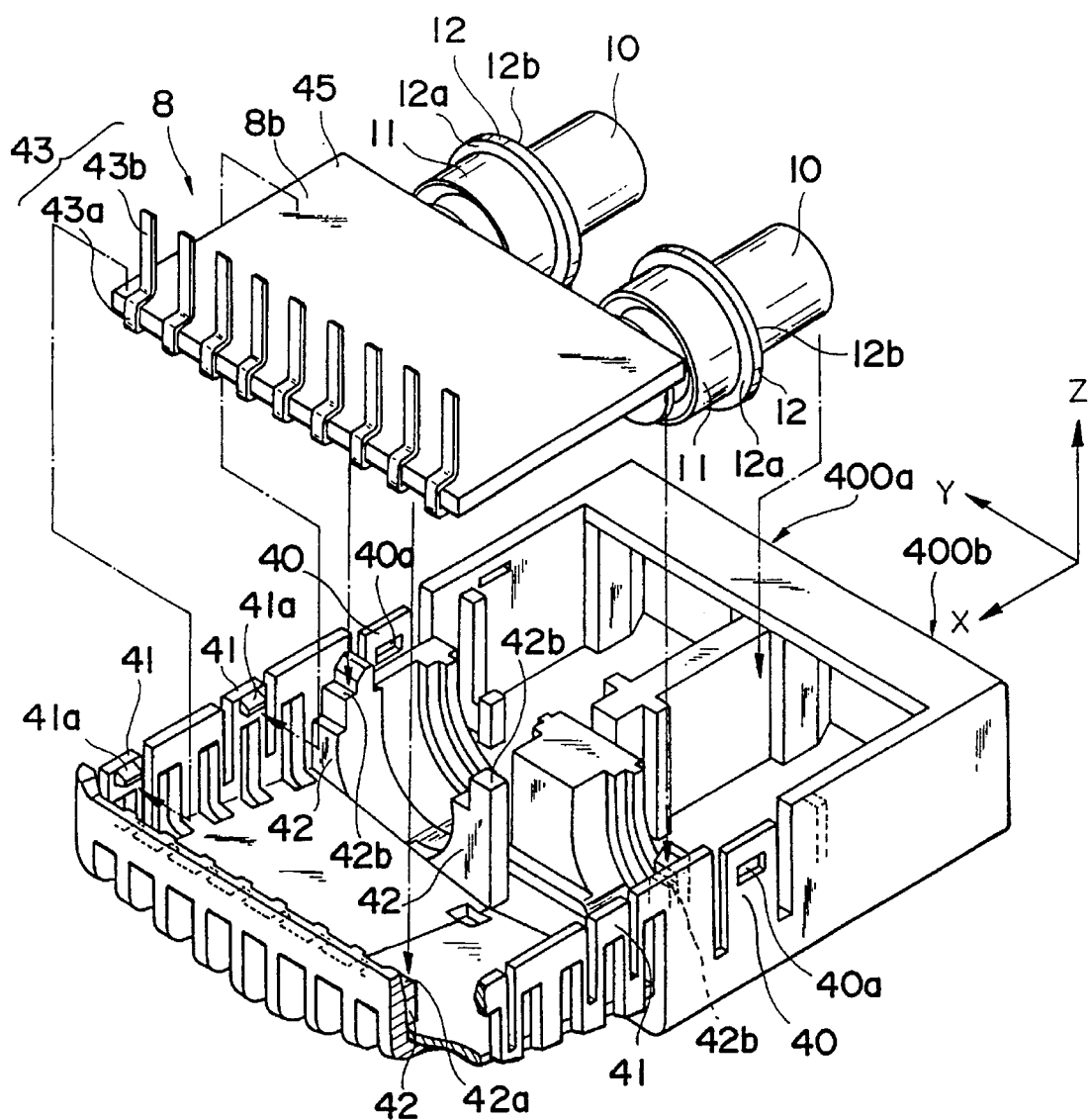
FIG. 5 is a perspective view for explaining the first half of the assembly process of the optical module according to the present invention.

FIG. 5 shows a structure in which the circuit board 8 having each sleeve 5 (6) thereon and the neck portions 46c and 46e bent in a predetermined shape is mounted in the opening portion of the housing 4.

A plurality of board support portions 42 are formed inside the housing 4, and an upper surface 8a (i.e., a surface on which the circuit elements 801 are mounted) of the circuit board 8 abuts against surfaces 42a and 42b of the board support portions 42. A plurality of hook pieces 41 are formed on the inner walls of the housing 4, and the edge portion of the circuit board 8 is clamped between lock portions 41a of the hook pieces 41 and the board support portions 42 to attach the circuit board 8 at the opening portion of the housing 4. At this time, the openings (openings of the insertion holes) of ferrule holding portions 10 of the sleeves 5 and 6 disposed in the cavity of the housing 4 respectively face openings 400a and 400b (openings for externally inserting ferrules 9a into the housing 4) formed in the front surface of the housing 4.

Figure 6:
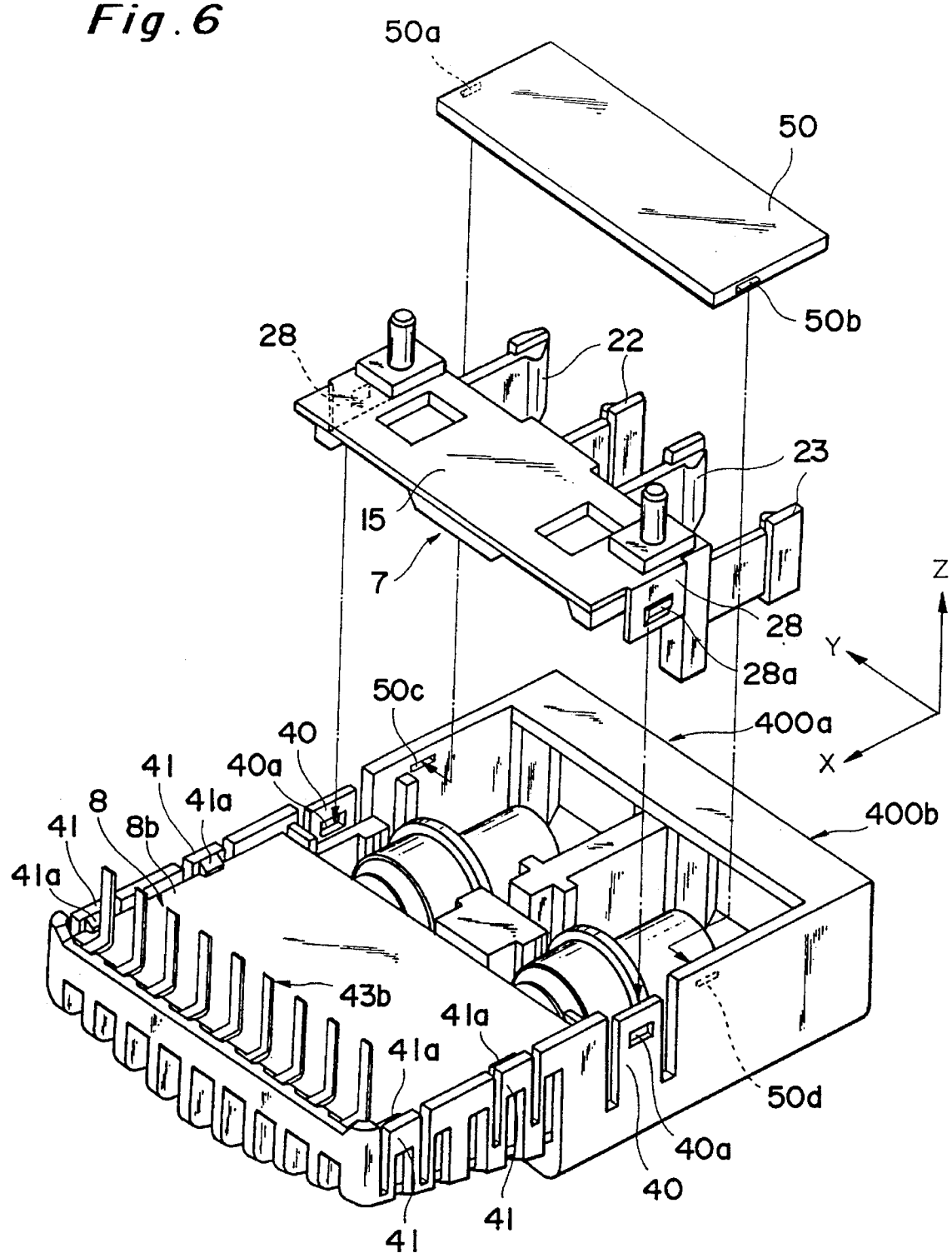
FIG. 6 is a perspective view for explaining the second half of the assembly process of the optical module according to the present invention.

When the circuit board 8 is mounted in the opening portion of the housing 4, and the sleeves 5 and 6 are accommodated to the housing 4, the sleeve holder 7 and the protective plate 50 are sequentially attached at the opening portion of the housing 4, as shown in FIG. 6.

More specifically, the first latch portions 28 are formed at both the sides of the base portion 15 of the sleeve holder 7, and the second latch portions 40 engaged with the first latch portions 28 are formed on the side walls of the housing 4. When the projections 28a of the first latch portions 28 are fitted in the openings 40a of the second latch portions 40 to attach the sleeve holder 7 at the opening portion of the housing 4. At this time, the sleeves 5 and 6 are automatically fixed at the predetermined positions in the housing 4.

The projections 50a and 50b are formed at both the ends of the protective plate 50, and the grooves 50c and 50d corresponding to the projections 50a and 50b are formed in the inner walls of the housing 4. When the projections 50a and 50b of the protective plate 50 are fitted in the grooves 50c and 50d to attach the protective plate 50 to the housing 4. As a result, the opening (i.e., the opening for receiving each sleeve 5 (6)) of the housing 4 is covered with the circuit board 8, the base portion 15 of the sleeve holder 7, and the protective plate 50.

A structure for fixing the sleeves 5 and 6 at the predetermined positions in the housing 4 will be described with reference to FIGS. 7 and 8.

Support portions 31 and 32 for the sleeves 5 and 6 projecting from the inner walls of the housing 4 are formed inside the housing 4.

The support portions 31 and 32 have first reference surfaces 31a and 32a for defining the fixing positions of the sleeves 5 and 6 along the insertion direction (an arrow F in FIG. 1) of the ferrules 9a of the sleeves 5 and 6, and second reference surfaces 37a and 38a for defining the fixing positions of the sleeves 5 and 6 in a direction perpendicular to the insertion direction of the ferrules 9a. In particular, the second reference surfaces 37a and 37b are surfaces of projections 37 and 38 arcuated along element holding portions 11 of the sleeves 5 and 6.

First surfaces 12a of flanges 12 of the sleeves 5 and 6 abut against the first reference surfaces 31a and 32a, respectively. The circumferential surfaces of the element holding portions 11 of the sleeves 5 and 6 abut against the second reference surfaces 37a and 38a, respectively.

Figure 8:
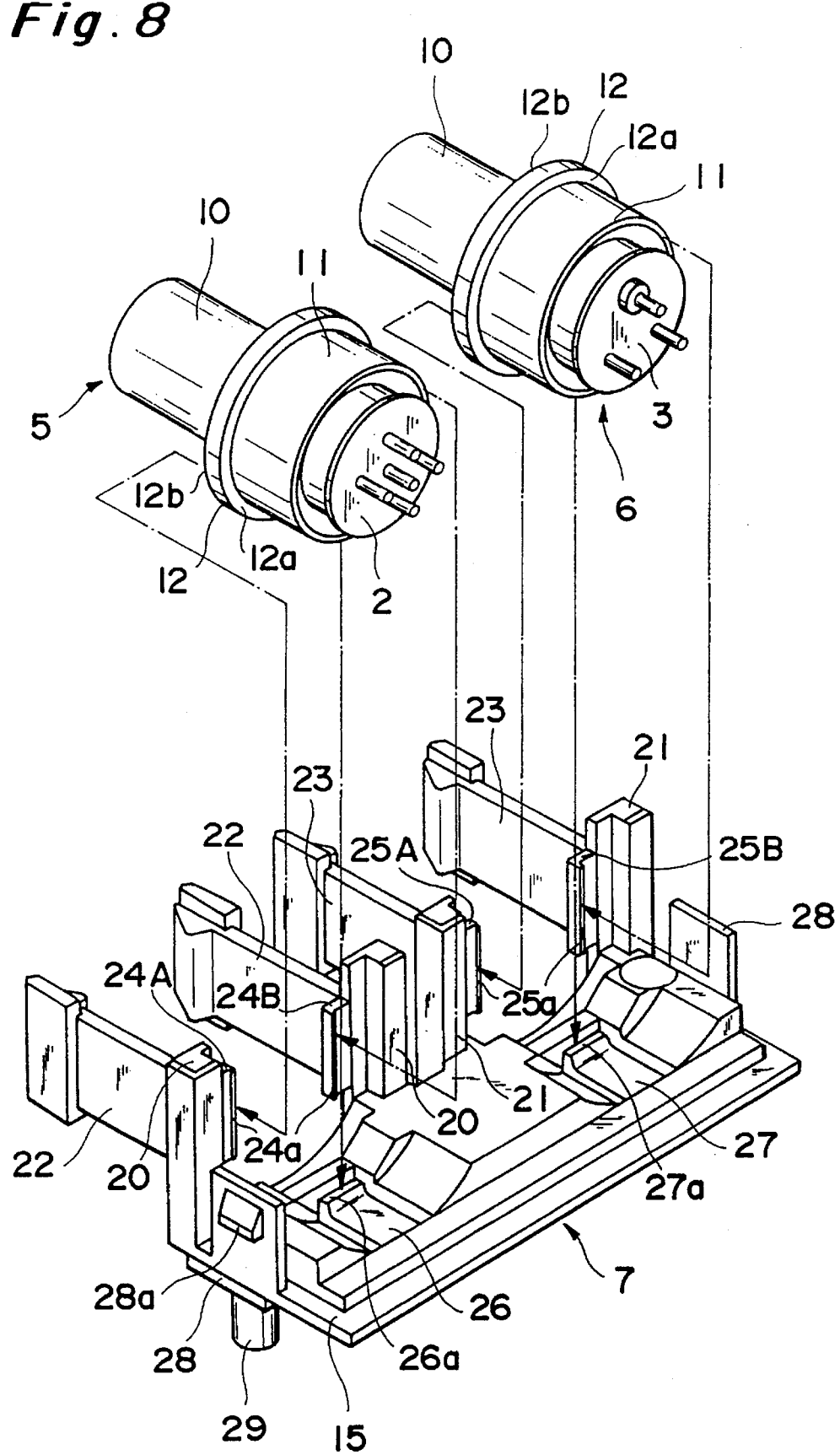
FIG. 8 is a perspective view for explaining the structure of a sleeve holder to fix the sleeves having optical operation elements at the predetermined positions in the cavity of the housing.

As shown in FIG. 8, first spring pieces 24A and 24B and first spring pieces 25A and 25B for defining the fixing positions of the sleeves 5 and 6 along the insertion direction of the ferrules 9a are formed in the sleeve holder 7. Second spring pieces 26 and 27 for defining the fixing positions of the sleeves 5 and 6 in a direction perpendicular to the insertion direction of the ferrules 9a are formed in the sleeve holder 7.

In particular, projections 24a or projections 25a which abut against the second surface 12b of the flange 12 of the corresponding sleeve 5 or 6 are formed on the first spring pieces 24A and 24B or the spring pieces 25A and 25B. When the sleeve holder 7 is mounted in the opening portion of the housing 4, the projections 24a and 25a function to urge the first surfaces 12a of the flanges 12 of the sleeves 5 and 6 against the first reference surfaces 31a and 32a of the housing 4.

Projections 26a and 27a which abut against the outer walls of the element holding portions 11 of the sleeves 5 and 6 are formed in the second spring pieces 26 and 27. When the sleeve holder 7 is attached to the housing 4, the projections 26a and 27a function to urge the outer walls of the element holding portions 11 of the sleeves 5 and 6 against the second reference surfaces 37a and 38a of the housing 4. In addition, a third spring piece 35 (36) is formed in the housing 4 and functions in the same manner as in the first springs (see FIGS. 14 and 15).

The sleeve gripping structure as described above will be described in detail below with reference to FIGS. 9 to 12 with regard to the relationship between the sleeve holder 7 and the sleeve 5 (6) and the relationship between the housing 4 and the sleeve 5 (6). Note that, in FIGS. 9 to 12, the structures of the sleeve holder 7 and the housing 4 are simplified.

Figure 9:
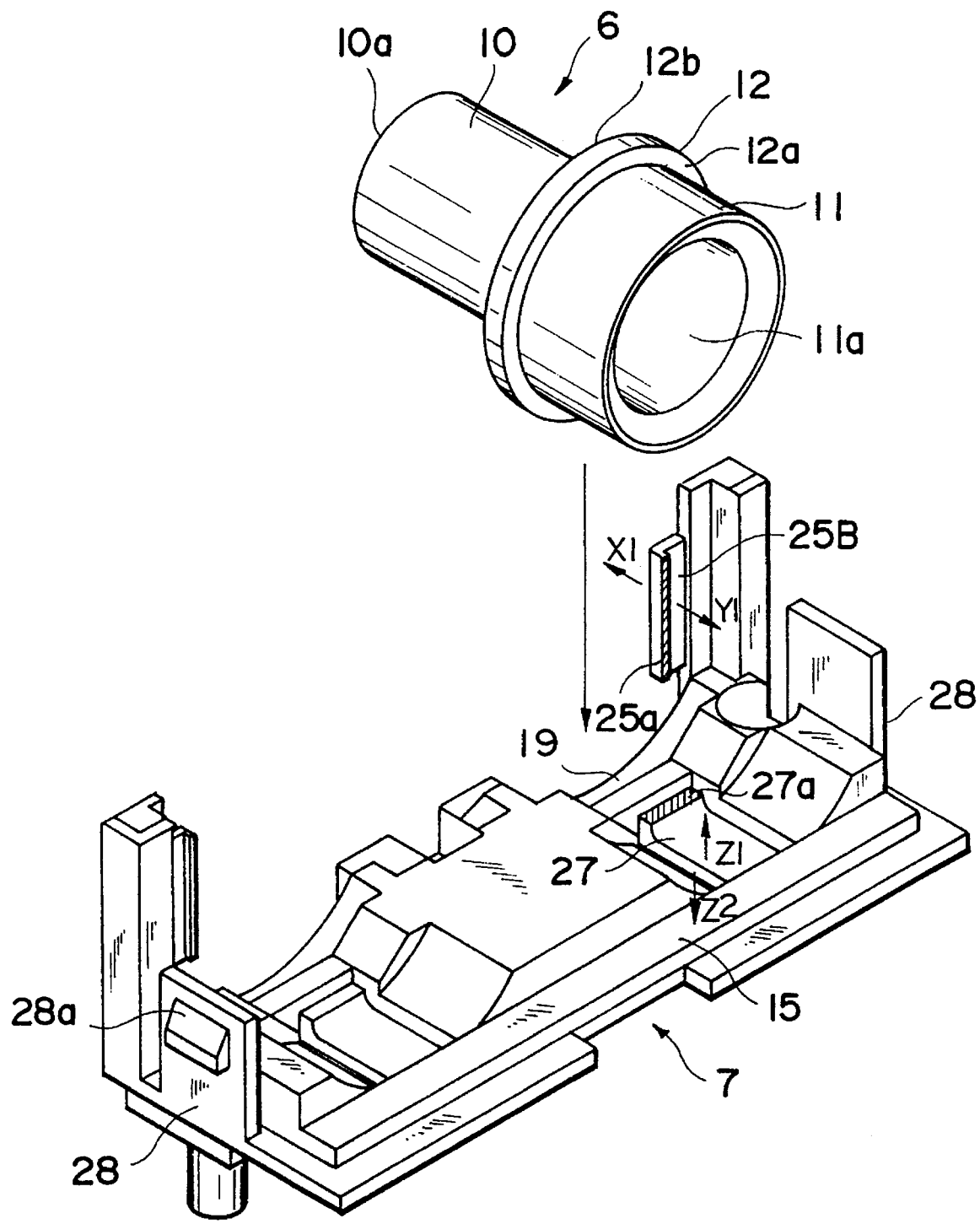
FIGS. 9 and 10 are perspective views illustrating the simplified structures of the sleeve holder to explain a structure for holding the sleeve by the sleeve holder in detail.
Figure 10:
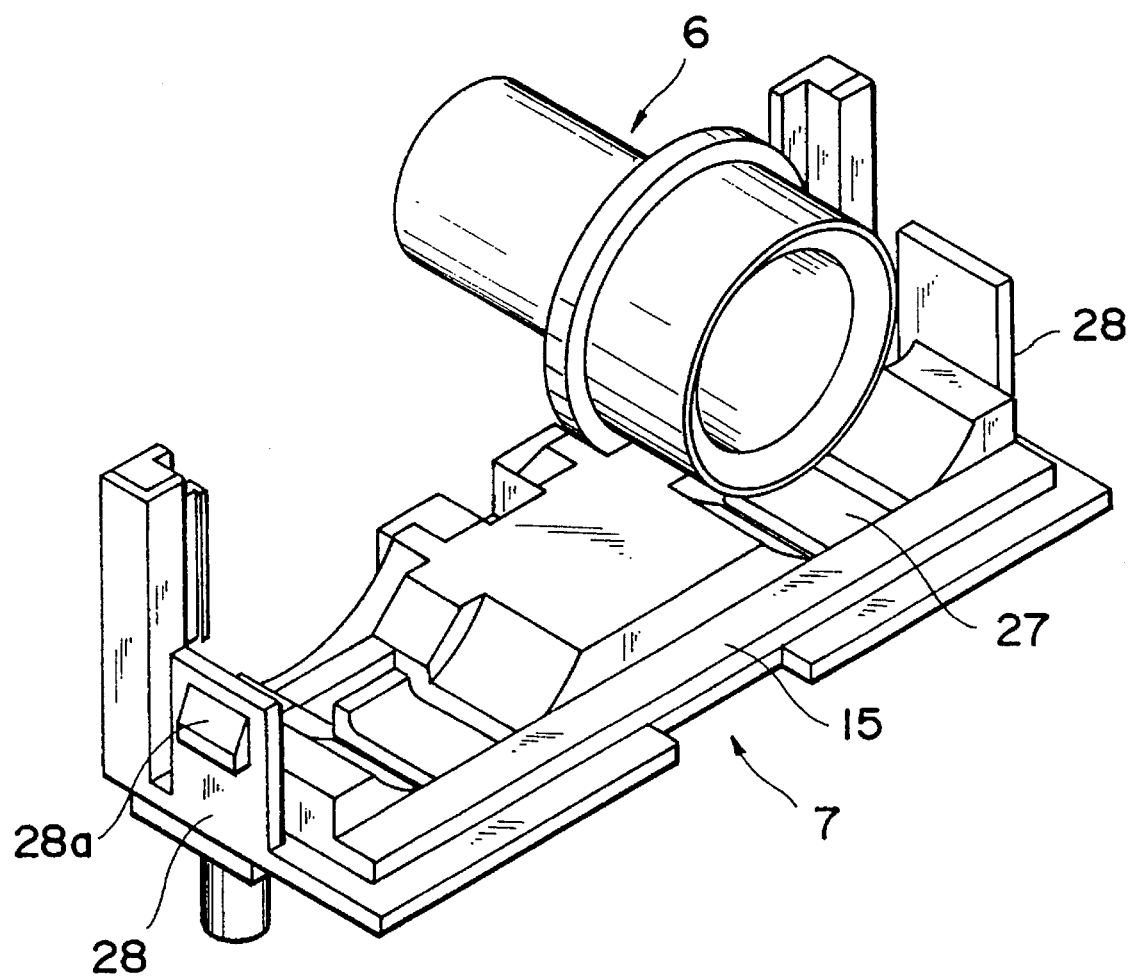

Part of the flange 12 of the sleeve 6 shown in FIG. 9 is buried in a recess 19 of the sleeve holder 7. As shown in FIG. 10, part of the element holding portion 11 is buried in the sleeve holder 7 to hold the element holding portion 11. While the flange 12 slightly presses a spring piece 25 in a direction indicated by X1 in the drawing, part of the flange 12 is stored in the recess 18. The second surface 12b of the flange 12 contacts a projection 25a of the spring piece 25 of the sleeve holder 7. The flange 12 is pressed in a direction indicated by Y1 in the drawing by the rebound force of the spring piece 25. On the other hand, the outer circumferential surface of the element holding portion 11 contacts the projection 27a of the spring piece 27.

Figure 11:
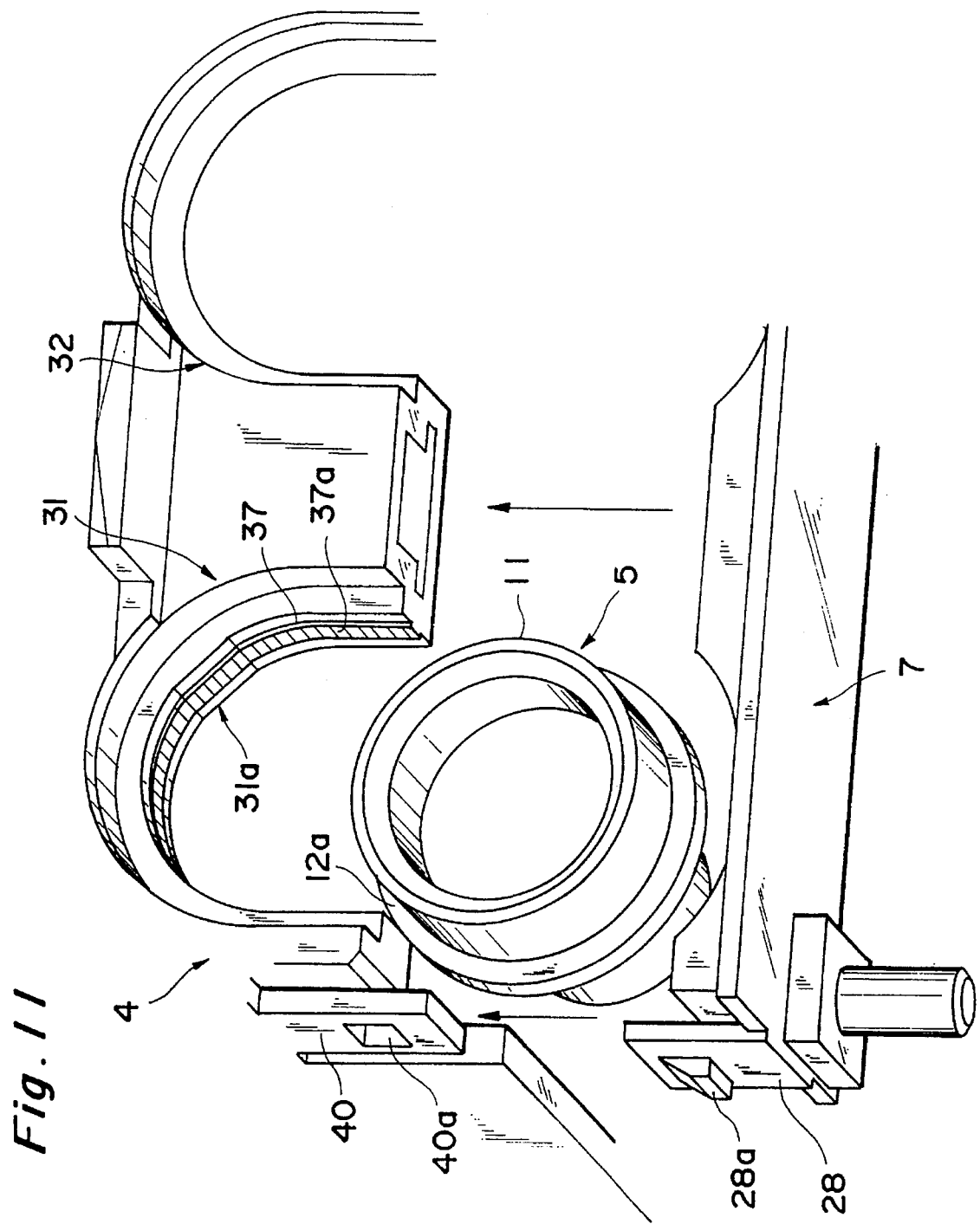
FIGS. 11 and 12 are perspective views showing the simplified structures of the sleeve holder and the housing to explain a structure for holding the sleeve by the sleeve holder and the housing in detail.
Figure 12:
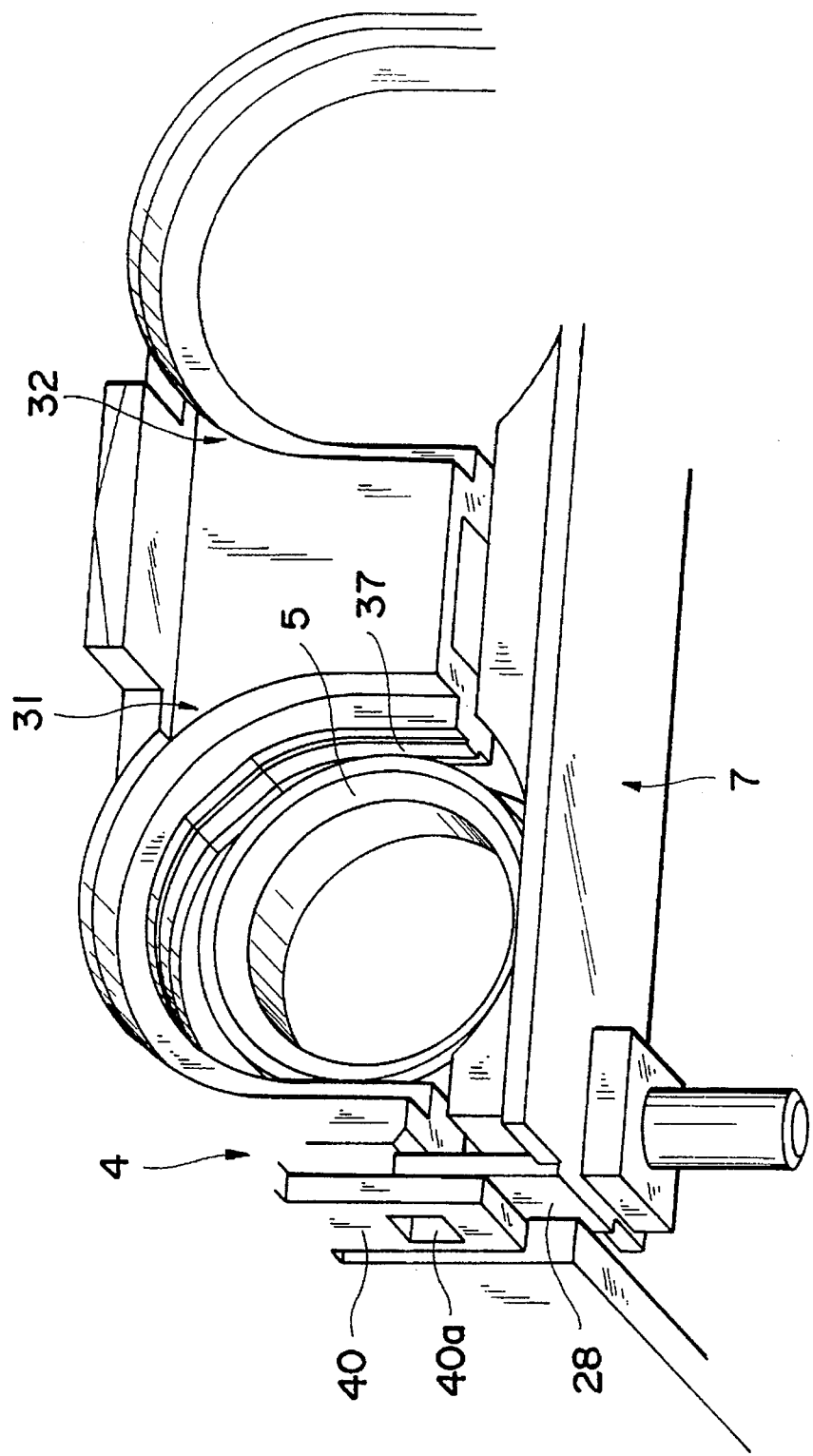

As shown in FIGS. 11 and 12, when the first latch portions 28 of the sleeve holder 7 are engaged with the second latch portions 40 of the housing 4 (the sleeve holder 7 is mounted on the housing 4 with a one-touch operation by fitting the projections 28a of the first latch portions 28 in the openings 40a of the second latch portions 40), part of the outer circumferential surface of the element holding portion 11 of the sleeve 5 is pressed by the projection 37 formed on the support portion 31 of the housing 4 (as well as the sleeve 6). That is, when the housing 4 is engaged with the sleeve holder 7, the projection 37 presses the element holding portion 11 of the sleeve 5 to press the spring piece 27 shown in FIG. 9 in a direction indicated by Z2 in the drawing. As a result, the rebound force acts on the spring piece 27 in a direction indicated by Z1 in the drawing. The element holding portion 11 of the sleeve 6 is urged against the projection 37 by the rebound force of the spring piece 27. The sleeve 5 is firmly gripped by the sleeve holder 7 and the support portion 31 of the housing 4, while part of the outer circumferential surface of the element holding portion 11 directly contacts the abutment surface 37a of the projection 37. On the other hand, the flange 12 pressed in the direction Y1 by the rebound force of the spring piece 25 is firmly gripped by the sleeve holder 7 and the support portion 31 of the housing 4, while the first surface 12a is urged against the first reference surface 31a of the support portion 31 of the housing 4.

As described above, the sleeve 6 (5) is firmly fixed at the predetermined position in the cavity of the housing 4 by gripping the flange 12 and the element holding portion 11 by the sleeve holder 7 and the housing 4 in the different directions.

The shapes and the like of the respective components constituting the optical module according to the present invention will be described in detail below.

Figure 13:
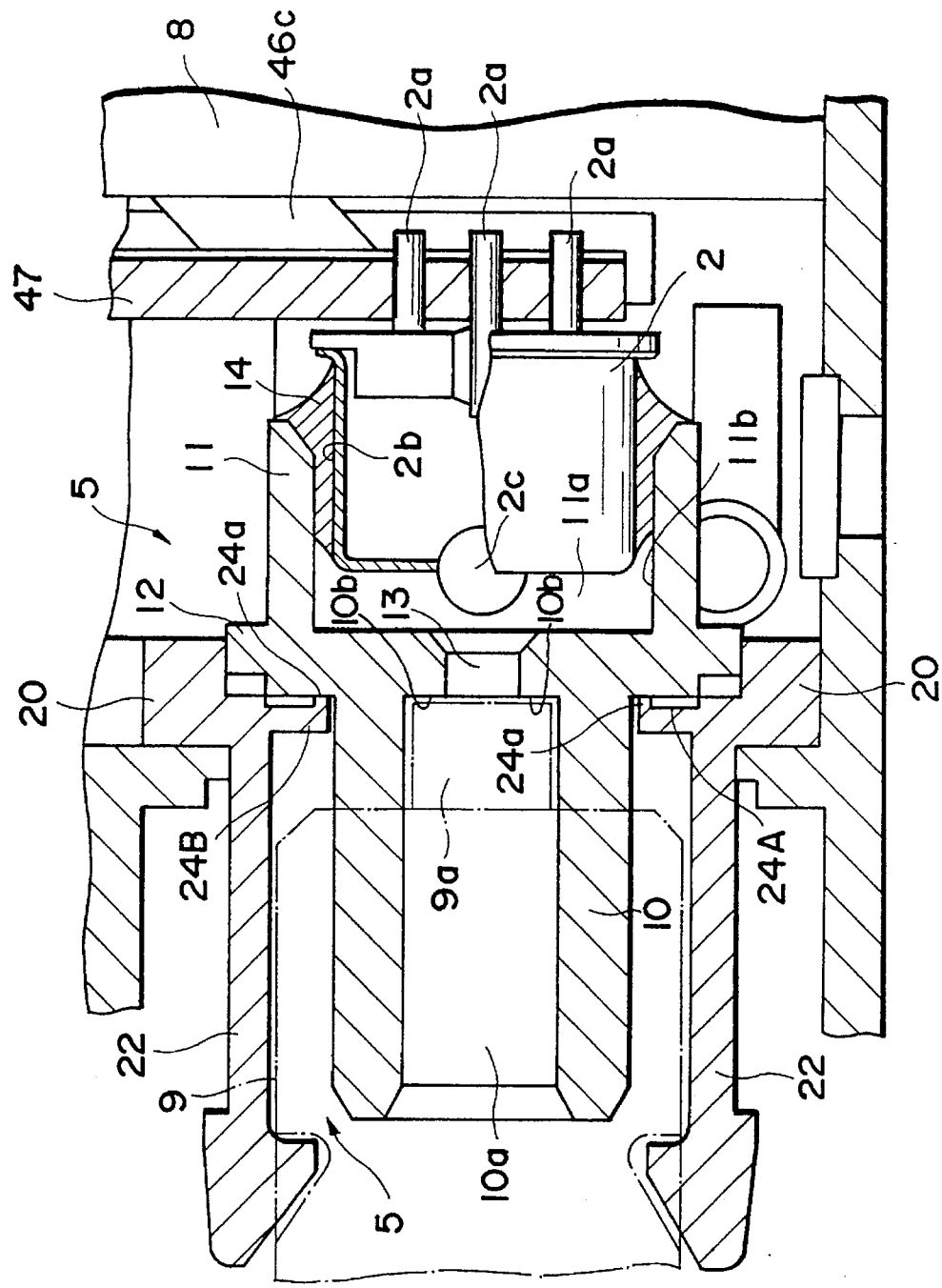
FIG. 13 is a sectional view of the sleeve along the line B—B in FIG. 1.
Figure 14:
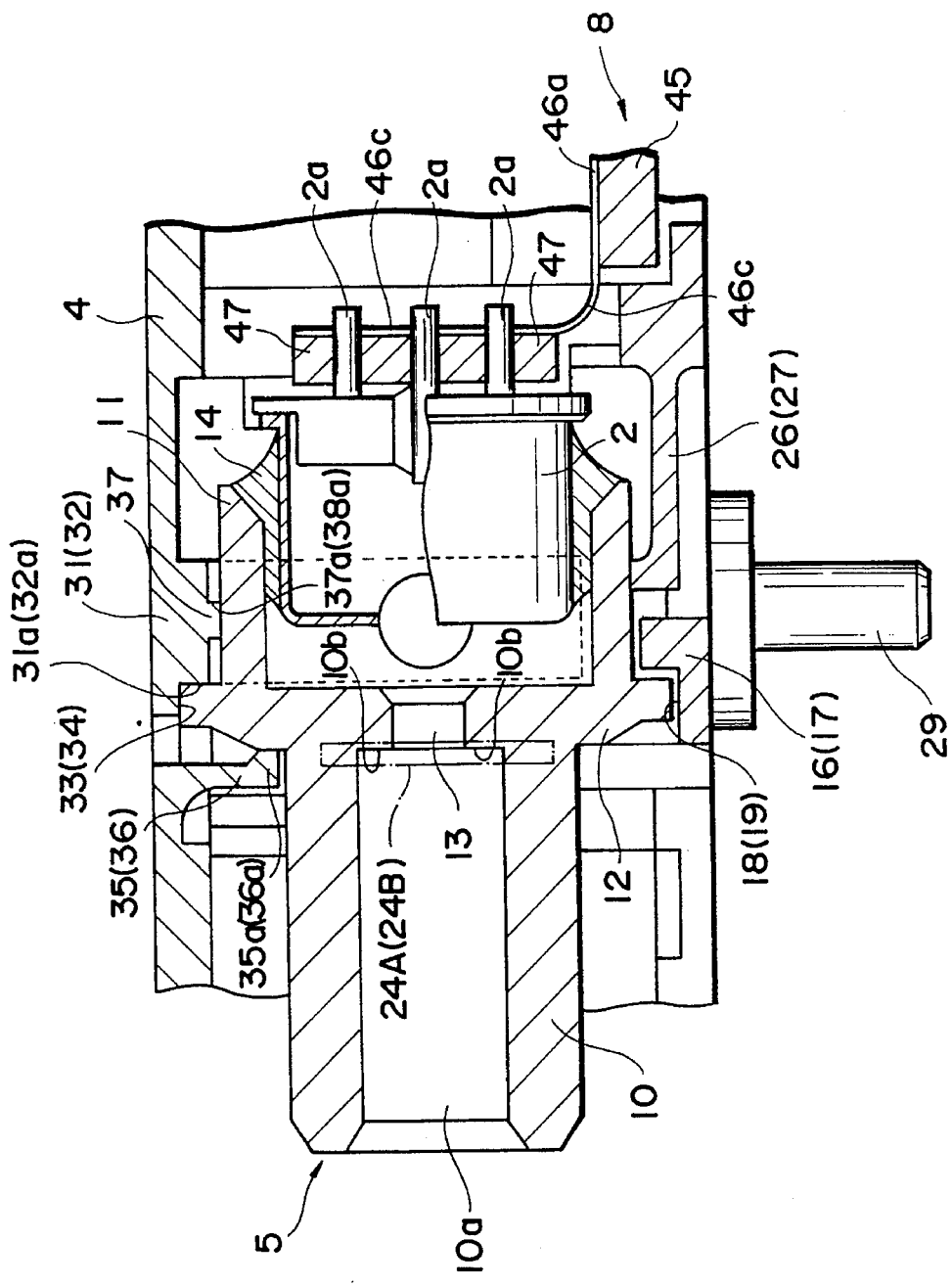
FIG. 14 is a sectional view of the sleeve along the line A—A in FIG. 1.

As shown in FIGS. 8, 13 and 14, the sleeve 5 (or the sleeve 6) comprises the cylindrical ferrule holding portion (first holding portion) 10 for accommodating the distal end of the cylindrical ferrule 9a, formed at the distal end portion of a connector plug 9, for holding the distal end of an optical fiber 900, a cylindrical element holding portion (second holding portion) 11 for accommodating the cylindrical optical operation element 2, and the flange 12 formed on the outer surface of the sleeve 5 so as to extend at the boundary area between the ferrule holding portion 10 and the element holding portion 11 in a direction perpendicular to the axis of the sleeve 5. The ferrule holding portion 10 has an elongated ferrule insertion hole 10a having a diameter almost equal to that of the ferrule 9a. An element insertion hole 11a having a diameter almost equal to or slightly larger than the outer diameter of the optical operation element 2 is formed in the element holding portion 11. In addition, the ferrule insertion hole 10a communicates with the element insertion hole 11a through a communication hole 13 to assure an optical conduction path extending from the optical operation element 2 to the ferrule 9a.

Figure 20:
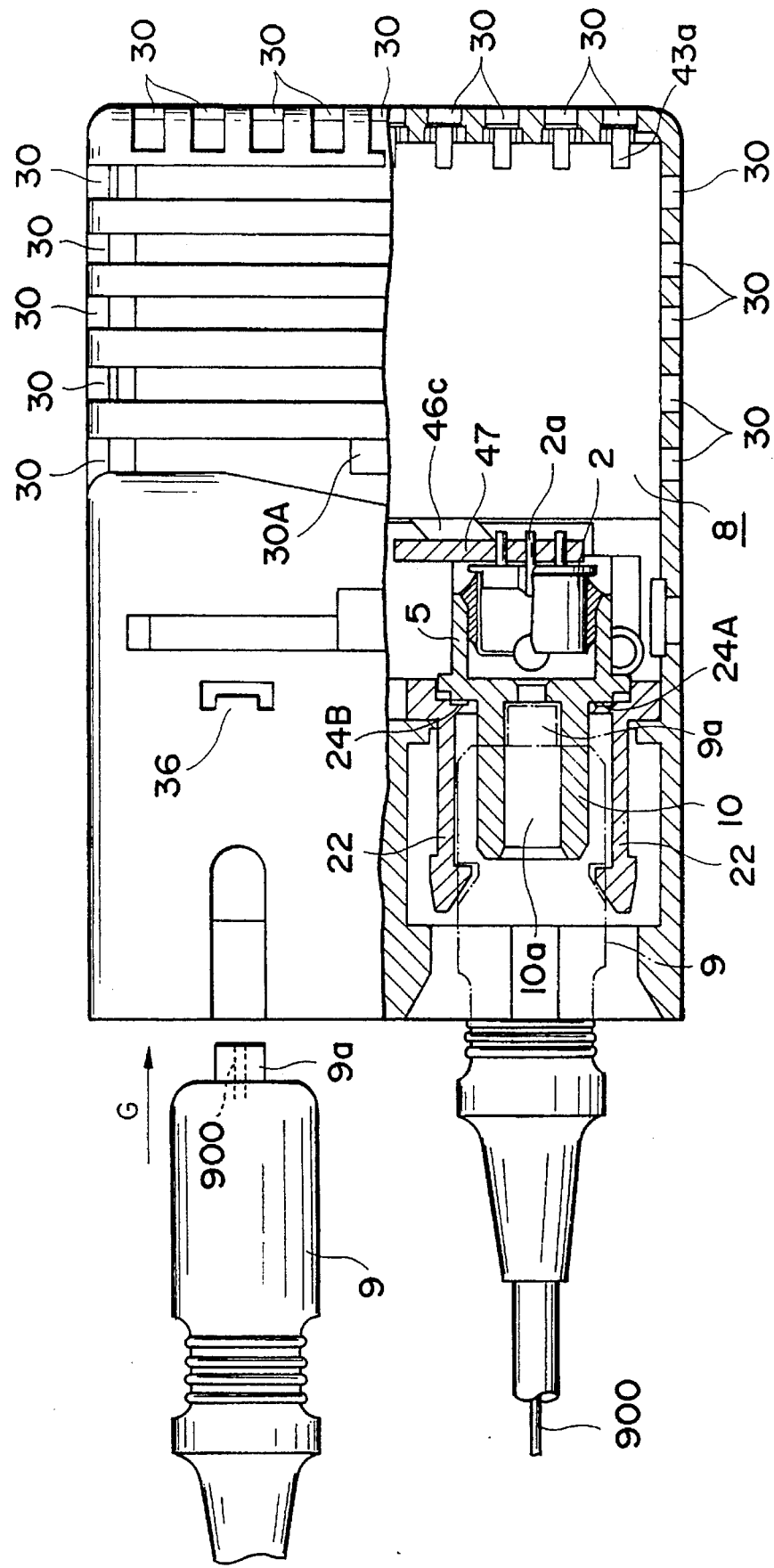
FIG. 20 is a partially cutaway plan view of the optical module according to the present invention (i.e., a view from a direction indicated by an arrow Z1 in FIG. 1)

The schematic arrangement of the connector plug 9 is shown in FIG. 20. Reference symbol G denotes an insertion direction of the ferrule 9a, which coincides with the direction of the arrow F in FIG. 1.

As shown in FIGS. 13 and 14, in each of sleeves 5 and 6, an inner surface 11b of the element holding portion 11 which defines the element insertion hole 11a and an outer surface 2b of the optical operation element 2 are adhered and fixed to each other with a UV (ultraviolet)-curing resin 14 prior to the assembly of the optical module 1. In the assembly process, the optical operation element 2 (3) is aligned with the central axis of the sleeve 5 (6) while measuring a photosensitivity of the element 2 or an optical output intensity from the element 3. The terminals 2a of the optical operation element 2 are extended from the end face of the element holding portion 11 to facilitate electrical connection with the circuit board 8. Note that the sleeve 6 in which the optical operation element 3 is adhered and fixed has the same arrangement as that of the sleeve 5. FIG. 13 is a sectional view near the sleeve along the line B—B in FIG. 1, and FIG. 14 is a sectional view near the sleeve along the line A—A in FIG. 1.

As shown in FIG. 9 and 14, the sleeve holder 7 has the base portion 15. U-shaped storage portions 16 and 17 are formed in the base portion 15 to partially buried the lower portions of the element holding portions 11 of the sleeves 5 and 6. The recesses 18 and 19 are formed at the end portions of the u-shaped storage portions 16 and 17 to partially buried the lower portions of the flanges 12 of the sleeves 5 and 6. A pair of columns 20 or 21 extend at one end of the base portion 15 to locate the corresponding one of the first flange storage portions 18 and 19. A pair of latch levers 22 or 23 are formed at the front surfaces of the columns 20 or 21 to fit in the corresponding connector plug 9 (FIG. 14).

The spring pieces 24A and 24B extending to oppose each other are formed as the first spring pieces on the side surfaces of the pair of columns 20. Similarly, the pair of spring pieces 25A and 25B are formed as the first spring pieces on the pair of columns 21 in the same manner as described above. The projections 24a projecting toward the flange 12 of the sleeve 5 are formed on the spring pieces 24A and 24B. The projections 24a abut against the second surface 12b of the flange 12 and presses the flange 12 in the optical axis direction (coinciding with the arrow F in FIG. 1). The spring pieces 25A and 25B have projections 25a having the same function as described above.

The elastic tongue pieces 26 and 27 (second spring pieces) are formed in the bottom portions of the storage portions 16 and 17 in the base portion 15. The second spring pieces 26 and 27 partially abut against the lower portion of the element holding portion 11 of the sleeve 5 and presses the sleeve 5 toward the inner surface of the housing 4 (coinciding the direction of the arrow Z2 in FIG. 1). The pair of plate-like latch portions 28 engaged with the housing 4 are formed at both the side portions of the base portion 15. The projection 28a extending outward from each first latch portion 28 is formed at the distal end of this first latch portion 28. Stud pins 29 used to position the optical module 1 on a variety of boards are fixed on the bottom surface of the base portion 15 (see, e.g., FIG. 14).

Figure 7:
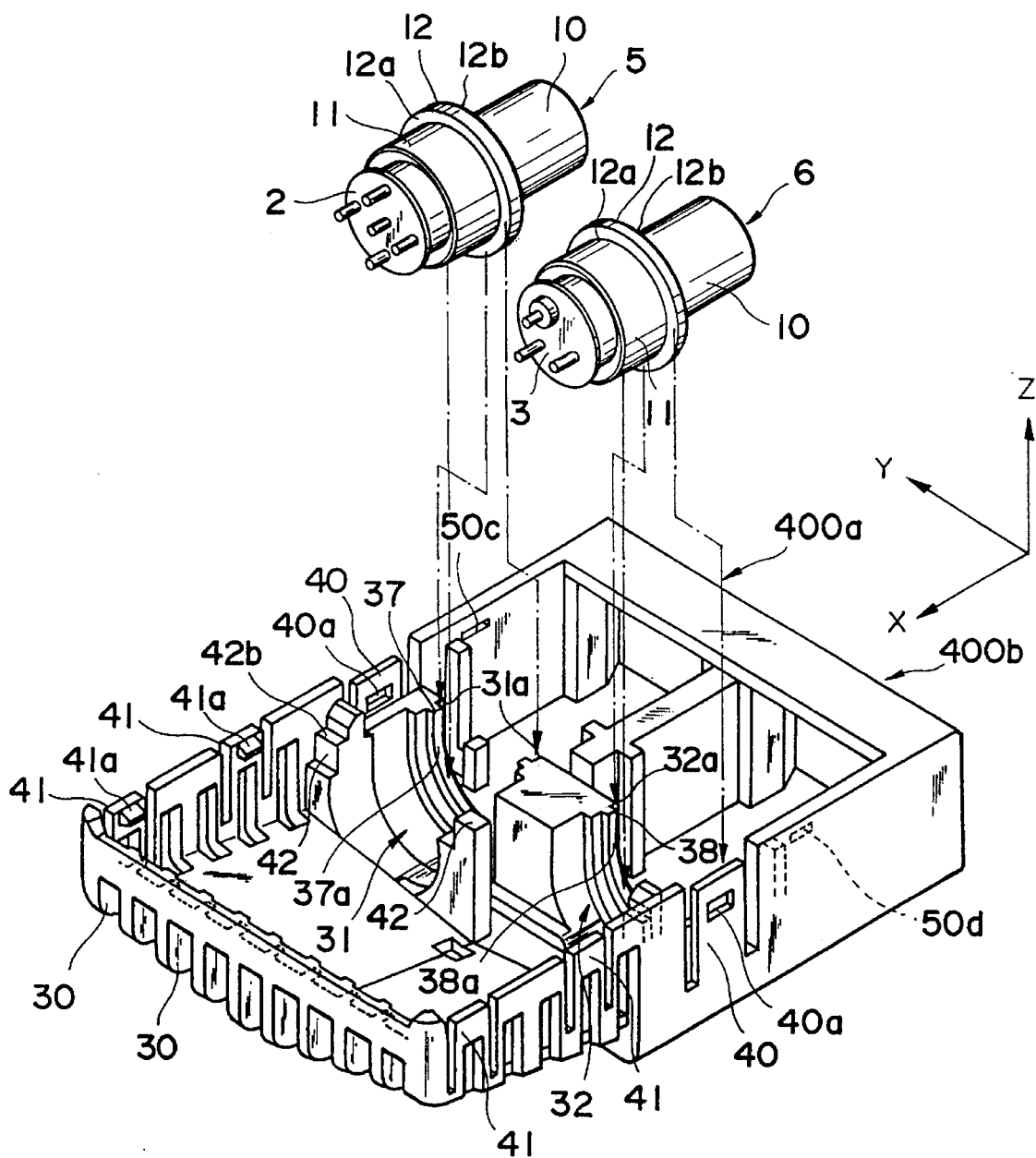
FIG. 7 is a perspective view for explaining the internal structure of a housing to fix sleeves having optical operation elements at predetermined positions in a cavity.
Figure 18:
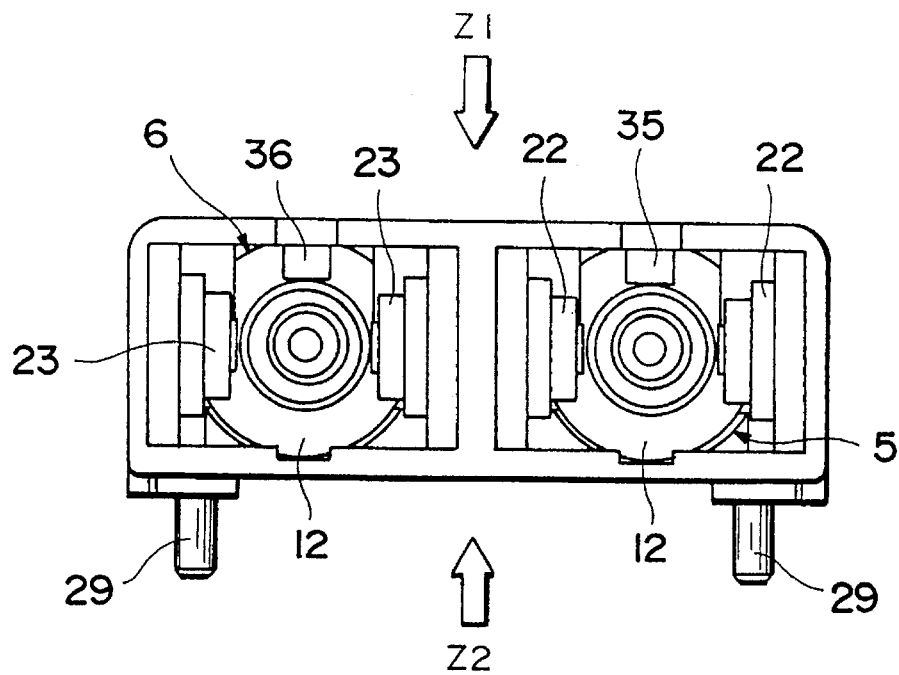
FIG. 18 is a front view of the optical module according to the present invention (i.e., a view from a direction indicated by an arrow F in FIG. 1)
Figure 19:
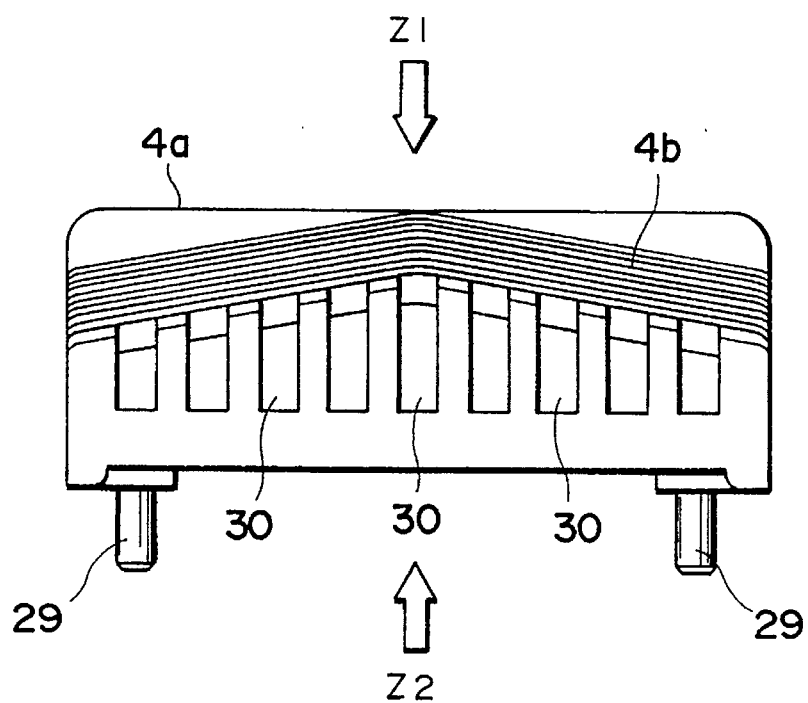
FIG. 19 is a rear view of the optical module according to the present invention (i.e., a view from a direction indicated by an arrow R in FIG. 1)

As shown in FIGS. 2, 5, and 7, the bottom surface of the housing 4 is removed to have a U-shaped section. The inner surface of the housing 4 has a flat portion 4a at the position where the sleeves 5 and 6 are accommodated (see FIG. 18) and a peaked roof portion 4b at a position opposing the upper surface 8a of the circuit board 8 (see FIG. 19). A pair of side walls 4c are integrally formed with both the side portions of the housing 4 to extend by the overall length of the housing 4, as shown in FIG. 6. These side walls 4c extend from the flat portion 4a and the peaked roof portion 4b to the bottom portion (opening portion) of the housing 4. A rear wall 4d for coupling one end of each side wall 4c is formed integrally with the rear portion of the housing 4. The rear wall 4d extends from the peaked roof portion 4b to the bottom portion of the housing 4.

A plurality of drain holes 30 extending through the walls are formed in the side walls 4c and the rear wall 4d. A drain hole 30A is formed in part of the peaked roof portion 4b (see FIG. 20). The drain holes 30 and 30A are formed in correspondence with the cavity in which the circuit board 8 is attached to the housing 4. The space surrounded by the inner walls of the housing 4 and the circuit board 8 communicates with the outside of the housing 4. In cleaning the optical module 1, the interior of the housing 4 can be properly cleaned, and at the same time, the cleaning solution can be efficiently drained from the housing 4.

Figure 21:
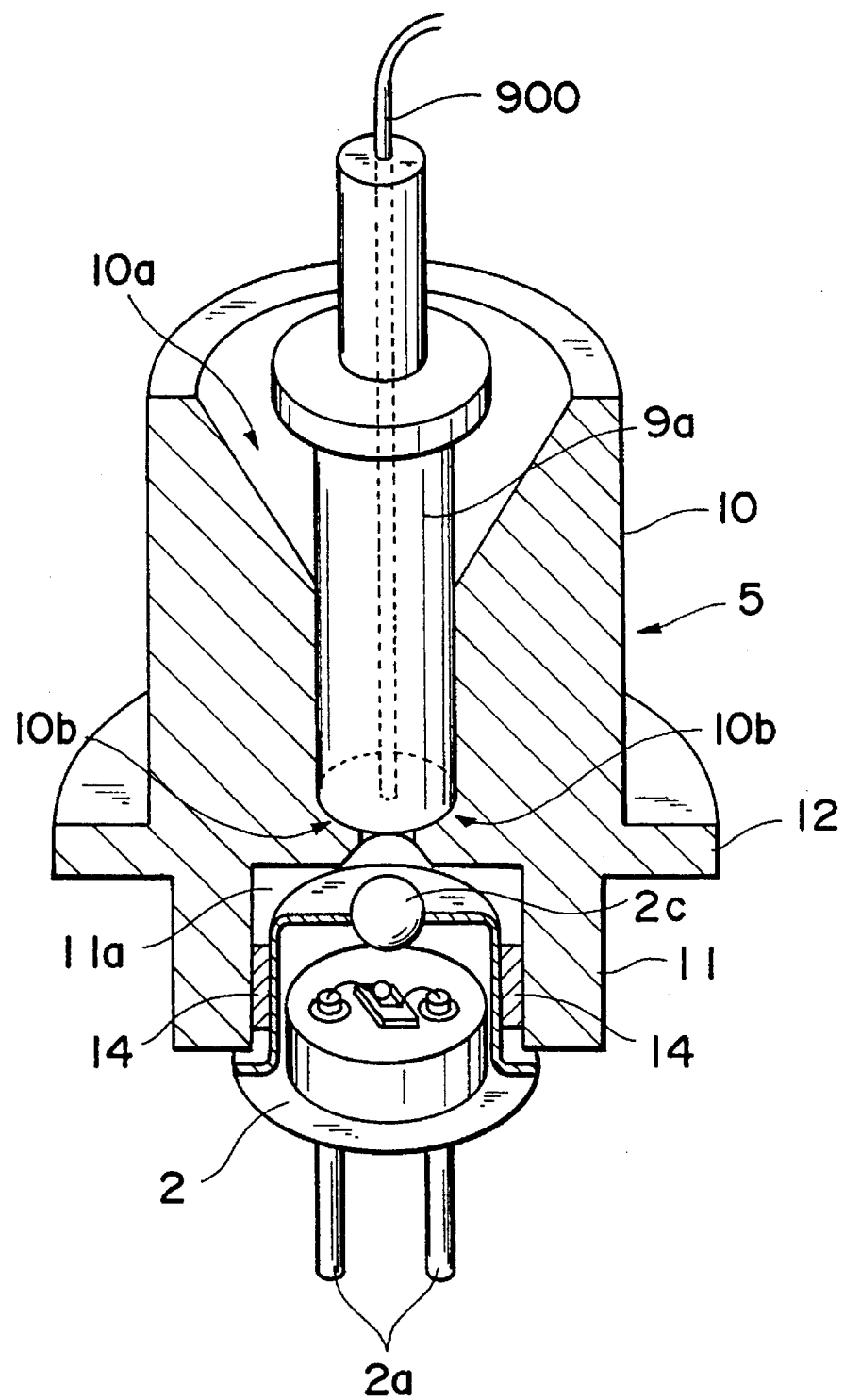
FIG. 21 is a sectional view showing the sleeve in a state wherein the optical fiber is optically coupled to the optical operation element.

FIG. 21 shows the sectional structure of the sleeve 5 shown in FIG. 20 for optically coupling the ferrule 9a to the optical operation element 2. Referring to FIG. 21, the optical operation element 2 is accommodated to the insertion hole 11a formed in the element holding portion 11 of the sleeve 5. Upon alignment, the optical operation element 2 is fixed in the insertion hole 11a with the ultraviolet-curing resin 14. On the other hand, the ferrule insertion hole 10a of the sleeve 5 has an abutment surface 10b which contacts the end face of the ferrule 9a. When the ferrule 9a holding the distal end of the optical fiber 900 is inserted in the insertion hole 10a formed in the ferrule holding portion 10, the end face of the ferrule 9a directly contacts the abutment surface 10b of the sleeve 5. Therefore, the distance between the end face of the ferrule 9a (the end face of the optical fiber 900) and the optical operation element 2 can be kept constant without any adjustment.

As shown in FIGS. 5 and 14, the almost U-shaped support portions 31 and 32 are formed in the inner wall surfaces of the housing 4 to hold the circumferential surfaces of the element holding portions 11 of the sleeves 5 and 6 downward. Almost U-shaped flange storage portions 33 and 34 for receiving the flanges 12 of the sleeves 5 and 6 are formed at the end portions of the support portions 31 and 32. When the sleeve holder 7 is attached to the housing 4, the flange storage portions 33 and 34 are located to oppose the recesses 18 and 19 formed in the sleeve holder 7. The recess 18 and the flange storage portion 33, and the recess 19 and the flange storage portion 34 surround the almost the entire circumferences of the flanges 12.

Figure 15:
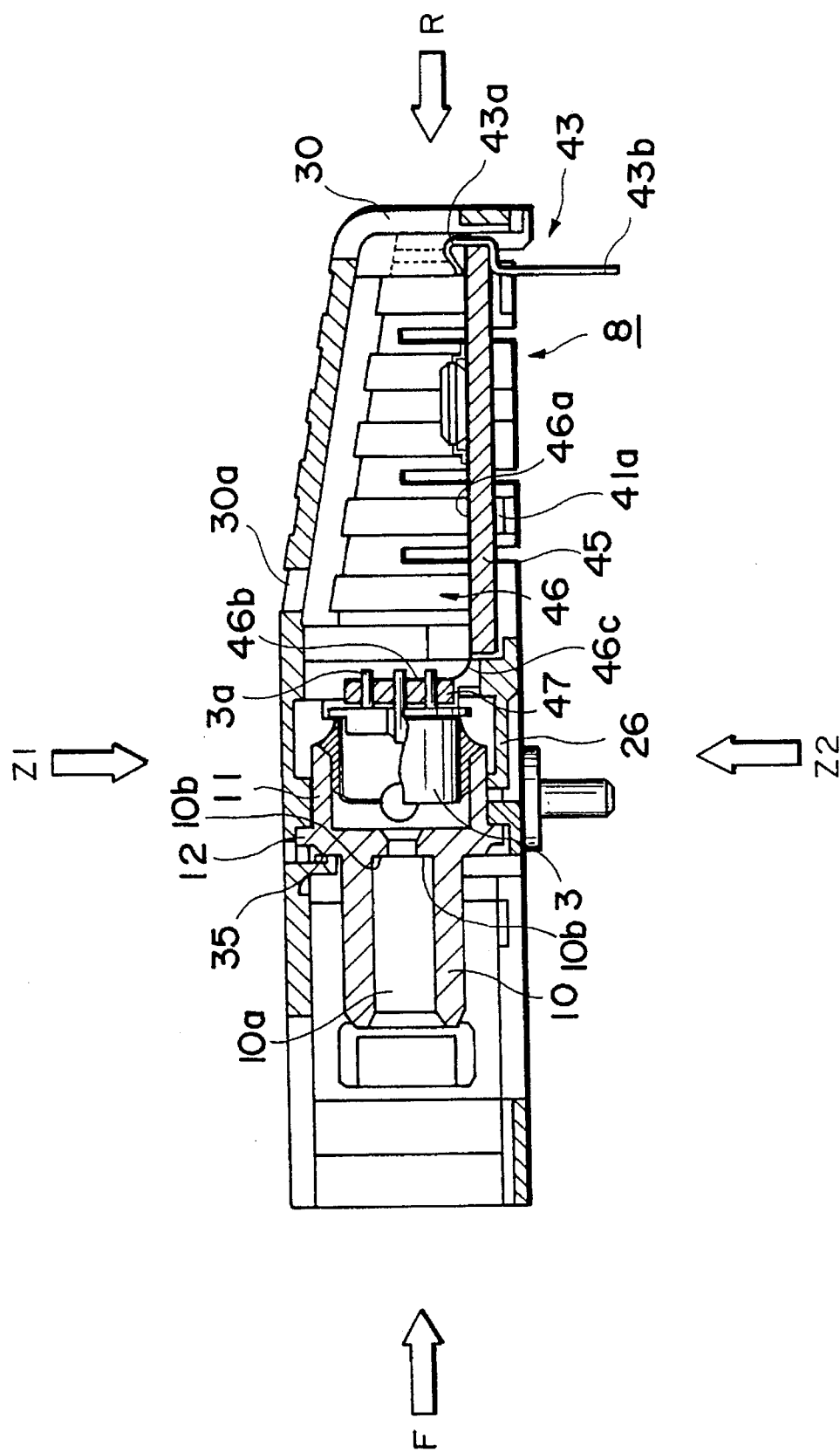
FIG. 15 is a sectional view of the sleeve along the line C—C in FIG. 1.

As shown in FIG. 15, the third spring piece 35 extending inward in the housing 4 is formed in the flat portion 4a of the housing 4. The third spring piece 35 abuts against the second surface 12a of the corresponding flange 12 to urge the first surface 12a of the flange 12 of the sleeve 5 against the first reference surface 31a. The third spring piece 36 extending inward is formed in the flat portion 4a of the housing 4 and functions to urge the flange 12 of the sleeve 6 in the same manner as described above. A projection 35a projecting toward the corresponding flange 12 is formed on the third spring piece 35. The projection 35a abuts against the second surface 12b of the corresponding flange 12 and presses this flange 12 in the optical axis direction. The third spring piece 36 similarly has a projection 36a.

The first reference surfaces 31a and 32a for supporting the first surfaces 12a of the flanges 12 of the sleeves 5 and 6 are formed in the support portions 31 and 32, respectively. The first reference surface 31a of the support portion 31 is formed on the surface perpendicular to the optical axis (i.e., the direction along which the ferrule 9a is inserted) along the support portion 31. The first reference surface 31a is formed at a position opposing the spring pieces 24A, 24B, and 35 through the corresponding flange 12. The first reference surface 32a of the support portion 32 is formed in the support portion 32 and located at a position opposing the spring pieces 25A, 25B, and 36 through the corresponding flange 12.

When the sleeve holder 7 is attached to the housing 4, the second surface 12b of the flange 12 of the sleeve 5 is pressed by the three portions, i.e., the spring pieces 24A, 24B, and 35. At the same time, the first surface 12a is urged against the first reference surface 31a of the support portion 31. As a result, in the optical axis direction (i.e., the insertion direction of the ferrule 9a), the sleeve 5 can be properly positioned in the housing 4, and at the same time, removal of the sleeve 5 along the optical axis direction can be prevented. This also applies to the sleeve 6.

The u-shaped projection 37 for supporting the circumferential surface of the element holding portion 11 of the sleeve 5 is formed on the support portion 31. The projection 37 extends in a direction perpendicular to the insertion direction G of the ferrule 9a and is formed along the arcuated surface of the support portion 31. The distal end face of the projection 37 is formed as the second reference surface 37a having a shape conforming to the circumferential surface of the element holding portion 11. For this reason, when the circumferential surface of the element holding portion 11 of the sleeve 5 is urged upward by the second spring piece 26, the circumferential surface of the element holding portion 11 abuts against the second reference surface 37a and is positioned in a direction perpendicular to the insertion direction G of the ferrule 9a. Similarly, the projection 38 and the second reference surface 38a are formed at the distal end face of the support portion 32. The element holding portion 11 of the sleeve 6 can be positioned by the second reference surface 38a and the spring piece 27 in the direction perpendicular to the insertion direction G of the ferrule 9a.

The pair of plate-like second latch portions 40 are formed on the side walls 4c of the housing 4. Each second latch portion 40 has the opening 40a engaged with the projection 28a of the corresponding one of the first latch portions 28 of the sleeve holder 7. When the first latch portions of the sleeve holder 7 are engaged with the second latch portions 40 of the housing 4, the housing 4 can be assembled with the sleeve holder 7 with a one-touch operation. Note that the openings 40a may be formed in the first latch portions 28, and the projections 28a may be formed in the second latch portions 40.

Figure 22:
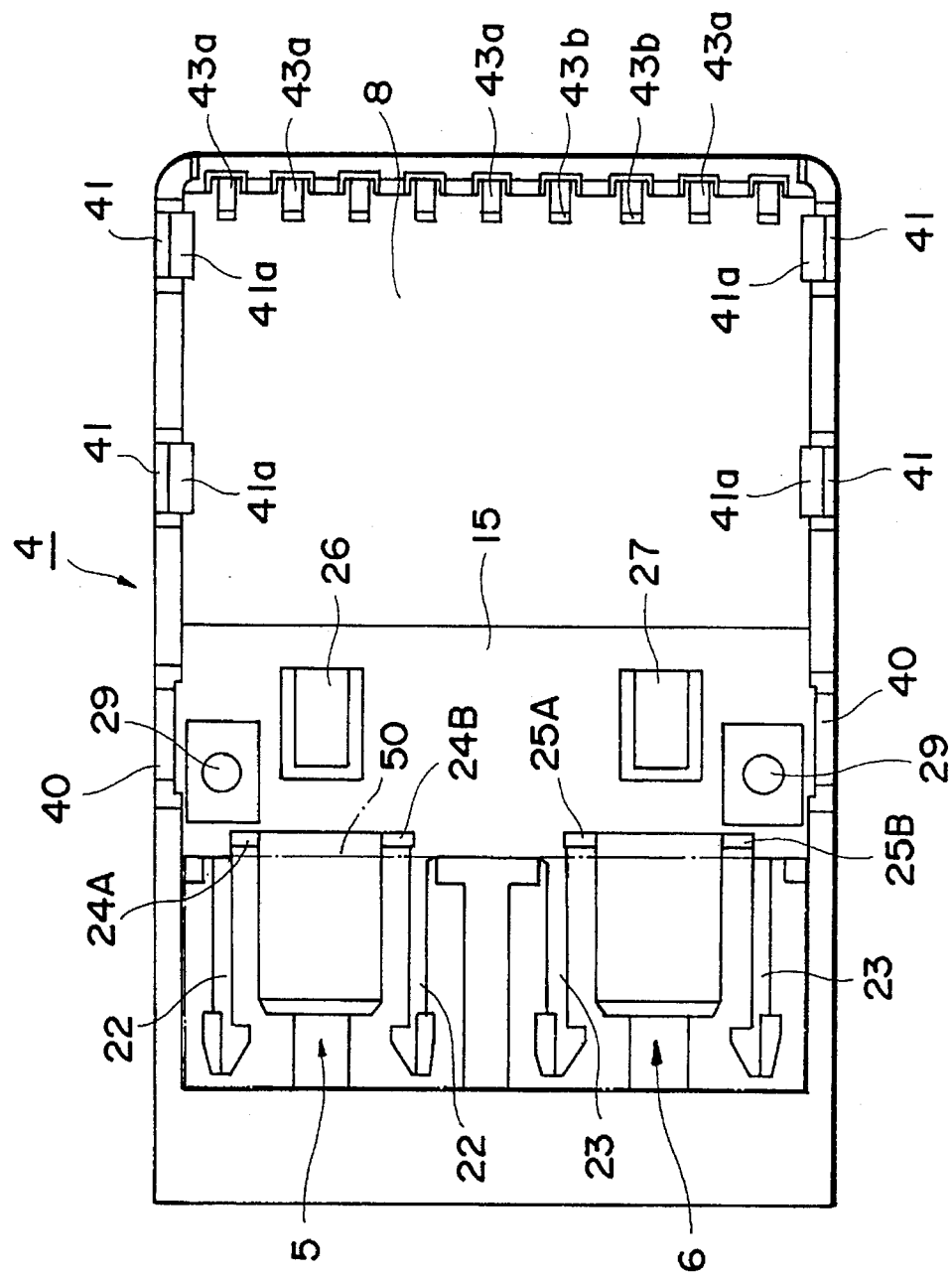
FIG. 22 is a bottom view of the optical module according to the present invention (i.e., a view from a direction indicated by an arrow Z2 in FIG. 1)

As shown in FIG. 5, the plurality of plate-like elastic hook pieces 41 for mounting the circuit board 8 in the housing 4 are formed on the inner sides of the side walls 4c of the housing 4. Each hook piece 41 has the pawl-like projection 41a extending inward. The projections 41a support the edge portions of a lower surface 8b of the circuit board 8 (FIG. 22). The plurality of board support portions 42 (projections) for supporting the upper surface 8a of the circuit board 8 are formed in the housing 4. Some of the board support portions 42 are formed along the inner wall 4d of the housing 4, while the remaining board support portions 42 are formed to extend from the peaked roof portion 4b of the housing 4. The support surfaces 42a and 42b of the board support portions 42 support the circuit board 8 (see FIG. 5). The circuit board 8 can be properly positioned and fixed to the housing 4 by the hook pieces 41 and the board support portions 42 with a one-touch operation (FIGS. 5 and 7). Note that, as another example, upper and lower locking projections 41a which are spaced apart from each other by the thickness of the circuit board 8 may be formed on each hook piece 41, and the circuit board 8 may be fixed between the locking projections 41a with a one-touch operation.

As shown in FIGS. 5 and 15, lead pins 43 are fixed to the rear end of the circuit board 8 at an equal interval. One end of each lead pin 43 is bent into a U shape to form a U-shaped clamping portion 43a having a predetermined clamping force at one end of each lead pin 43. The remaining portion of the lead pin 43 serves as a linear main body 43b of the lead pin. The clamping portions 43a clamp the rear end of the circuit board 8 to properly mount the lead pins 43 on the circuit board 8 with a one-touch operation, and thereafter these portions 43a are soldered to the board 8.

As shown in FIGS. 1 and 15, the circuit board 8 has the rectangular base plate 45 having a predetermined thickness and a proper bending strength. The main body 46a of the FPC 46 is fixed to the upper surface of the base plate 45. The FPC 46 has the rectangular main body 46a fixed to the upper surface of the base plate 45, the head portion 46b electrically connected directly to the terminals 2a of the optical operation element 2, and the neck portion 46c extending from the main body 46a to electrically connect the main body 46a to the head portion 46b. The auxiliary plate 47 having a predetermined thickness and a proper bending strength is fixed to the rear surface of the head portion 46b. The neck portion 46c has a higher degree of bending freedom because no support member is attached thereto. The head portion 46b can be easily bent from the main body 46a, and the positional relationship between the circuit board 8 and the optical operation element 2 can be freely set.

As shown in FIG. 3, the neck portion 46e extends from the front end portion of the main body 46a, and the head portion 46d to be connected to the optical operation element 3 is formed at the distal end of the neck portion 46e, in the same manner as described above. The auxiliary plate 48 is fixed to the rear surface of the head portion 46d.

Figure 16:
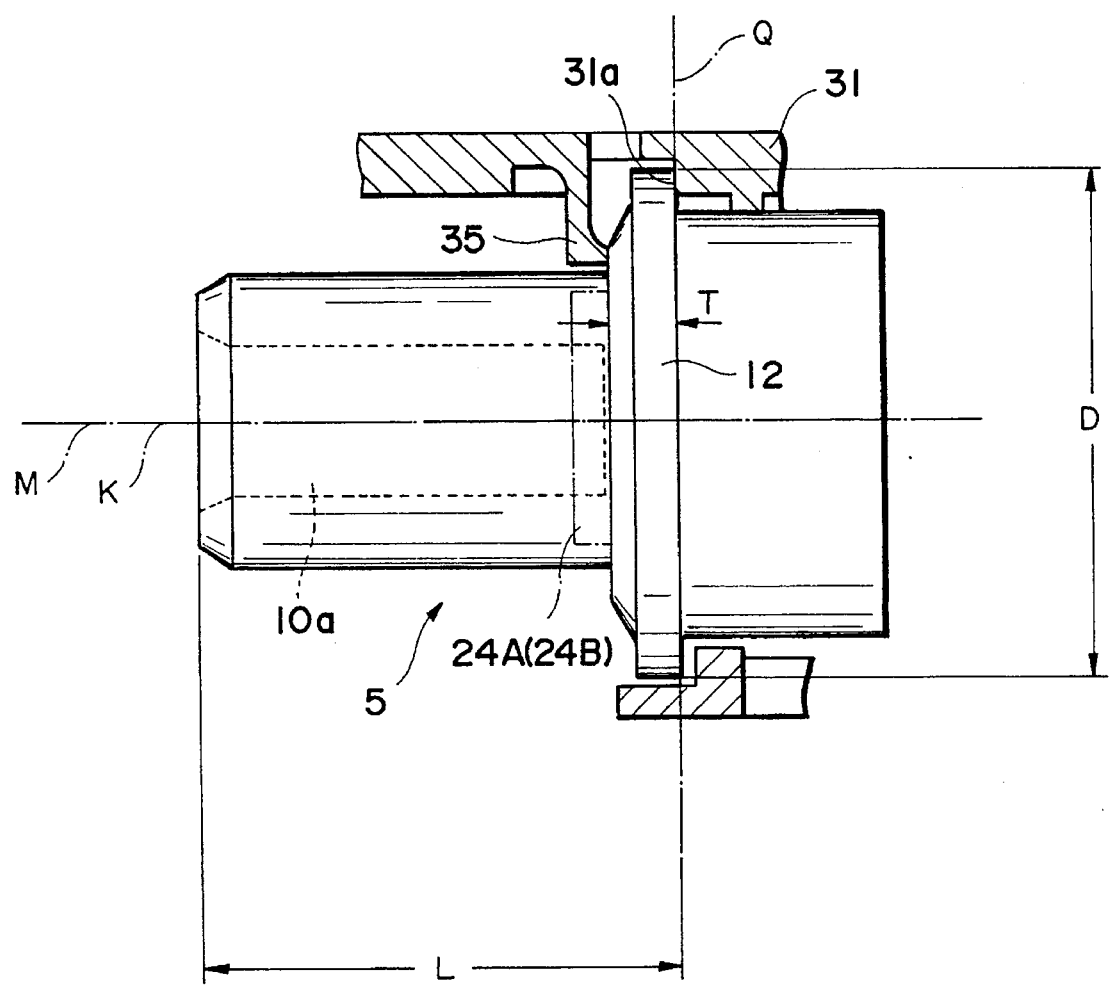
FIG. 16 is a schematic view (No. 1) showing the relationship between the effective length of a sleeve and the outer diameter of a flange.

The relationship between an outer diameter D of the flange 12 of the sleeve 5 and a sleeve effective length L from a reference plane Q coplanar with the first reference surface 31a to the distal end of the sleeve 5 (the opening portion of the ferrule holding portion 10) will be described with reference to FIG. 16. When a thickness T of the flange 12 is uniform, an optical axis K does not offset from an axis M of the ferrule insertion hole 10a even if the flange 12 is urged against the first reference surface 31a of the support portion 31 by the spring pieces 24A, 24B, and 35. For this reason, the alignment precision of the sleeve 5 can be increased.

Figure 17:
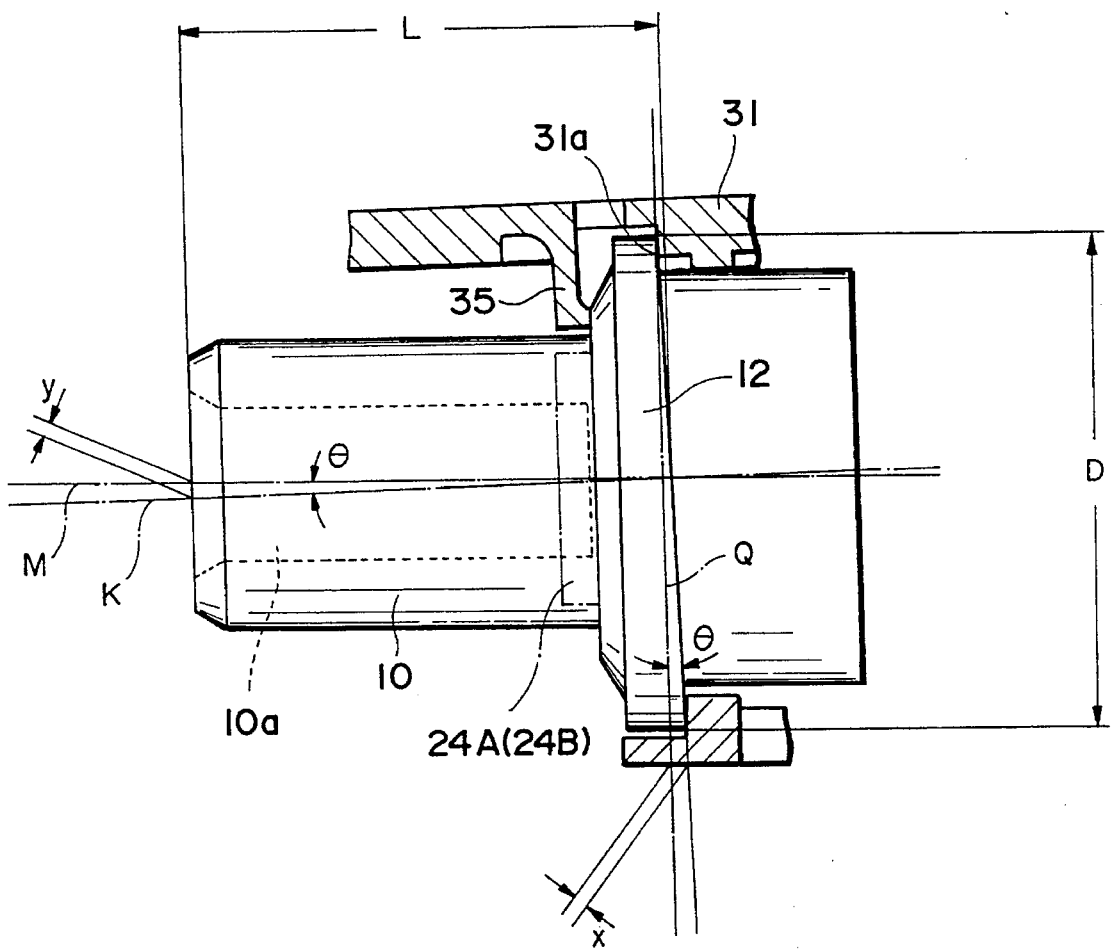
FIG. 17 is a schematic view (No. 2) showing the relationship between the effective length of a sleeve and the outer diameter of a flange.

To the contrary, as shown in FIG. 17, when the thickness of the flange 12 becomes nonuniform, the optical axis K offsets from the axis M of the ferrule insertion hole 10a, which affects the alignment precision of the sleeve 5. For example, assume that a thickness difference x is generated at the peripheral end of the flange 12. When the flange 12 is urged against the first reference surface 31a of the support portion 31 by the first to third spring pieces 24A, 24B, and 35, the optical axis K offsets from the axis M of the ferrule insertion hole 11a by an angle θ. An offset amount y is generated at the distal end of the sleeve 5. This relationship is given by y=L/D·x. Taking this into consideration, the influence of the nonuniform thickness of the flange 12 on the alignment precision of the sleeve 5 can be reduced by increasing the diameter D of the flange 12 with respect to the sleeve effective length L of the sleeve 5. Therefore, the alignment error of the sleeve 5 can be decreased by elongating the ferrule holding portion 10 of the sleeve 5.

As has been described above, according to the present invention, the sleeves 5 and 6, the sleeve holder 7, and the circuit board 8 can be properly attached to the housing 4 with one-touch operations.

Further, the first reference surface for supporting one side surface of the flange formed on the outer surface of the corresponding sleeve is formed on the corresponding support portion extending from the housing. The spring pieces which oppose the corresponding first reference surface and bias the other side surface of the flange of the sleeve are formed on the sleeve holder and the housing. With this arrangement, the support portion cooperates with the spring pieces to easily, properly position and fix each sleeve to the housing only by assembling the sleeve holder with the housing. Therefore, the working efficiency of the optical module can be increased, and mass production of low-cost optical modules can be realized.

Next, a resin sleeve applicable to an optical module 1 according to the present invention will be described.

Figure 23:
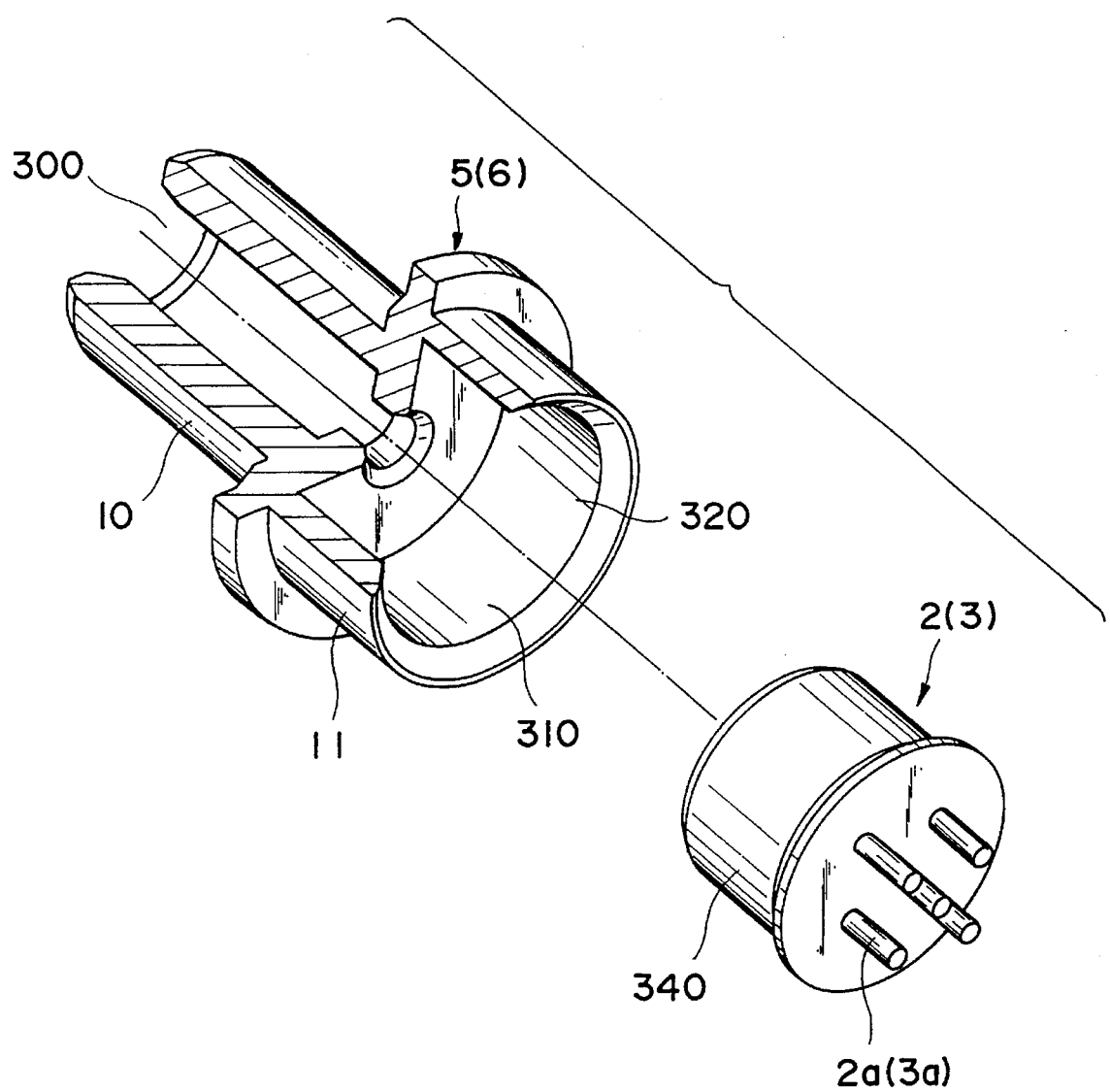
FIG. 23 is a partial sectional view showing the first embodiment of a combination of a sleeve and an optical operation element.

FIG. 23 is an enlarged partial cutaway perspective view showing an optical sleeve 5 (6) and an optical operation element 2 (3) before constituting a sleeve assembly. The optical sleeve 5 comprises a ferrule holding portion having a ferrule insertion hole 300 for accommodating the distal end portion of a ferrule 9a arranged at the distal end of a connector plug 9, and an element holding portion arranged to oppose the ferrule holding portion and having an element insertion hole 310. The element insertion hole 310 has a cylindrical inner wall (inner surface). An inner surface 320 of the element insertion hole 310 is metallized by deposition, sputtering, or plating using a metal such as nickel. On the other hand, the optical operation element 2 is packaged with a metal such as Kovar or a 42-alloy (plated with nickel). The optical operation element 2 has a cylindrical outer surface 340 having a diameter slightly smaller than that of the element insertion hole 310.

Figure 24:
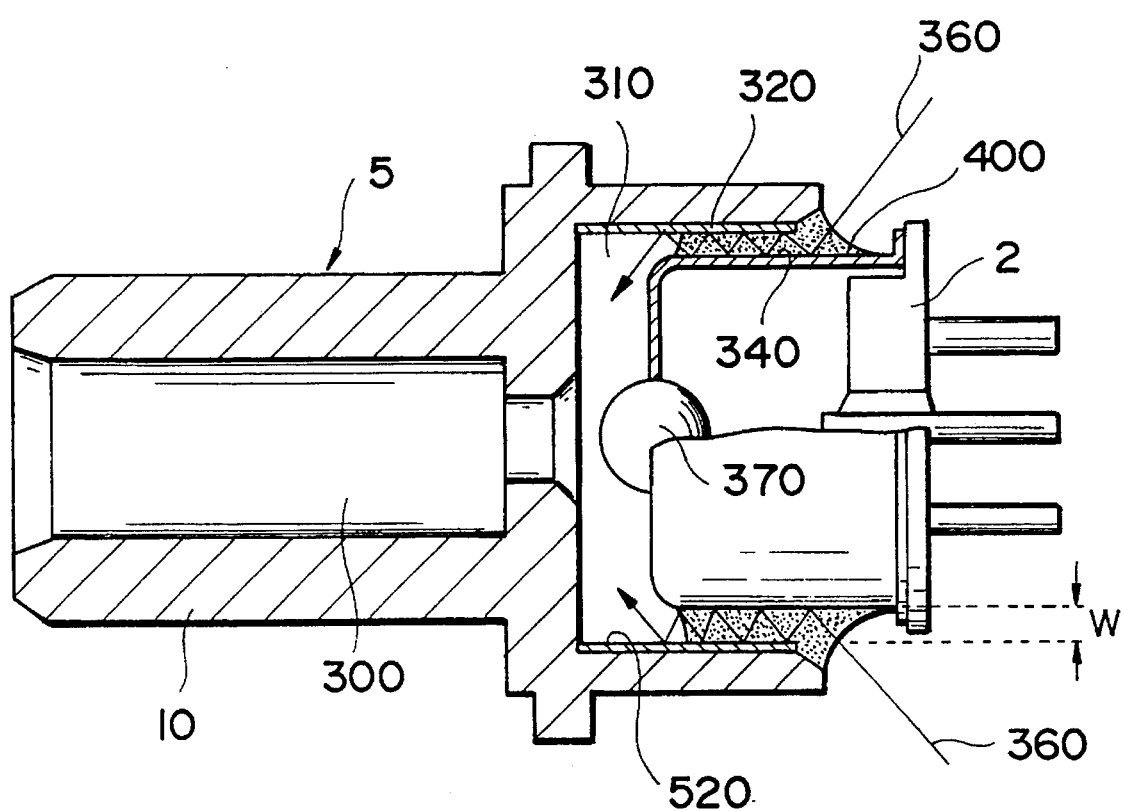
FIG. 24 is a sectional view for explaining the process for adhering and fixing the optical operation element in the sleeve shown in FIG. 23.

FIG. 24 is a sectional view showing a state in which the optical operation element 2 having the outer surface coated with a photo-setting resin 400 as an adhesive is inserted in the element insertion hole 310 of the sleeve 5. A gap w between the element insertion hole 310 and the optical operation element 2 is set to a value enough to join the optical operation element 2 to the element insertion hole 310 by the filled photo-setting resin 400. In other words, the value of the gap w is required for an alignment between the optical fiber and the optical operation element.

After the optical operation element 2 coated with the photo-setting resin 400 is inserted in the element insertion hole 310, positioning (optical axis alignment) is performed. The resultant structure is irradiated with ultraviolet rays 360 from the rear gap. The ultraviolet rays 360 propagate in a zig-zag manner while being repeatedly reflected between the outer surface 340 of the optical operation element 2 and a metal film 520 formed on the inner surface 320 of the element insertion hole 310. Since the reflecting surfaces at this time are metal surfaces, the ultraviolet rays 360 are mirror-reflected on the respective surfaces, and the losses on the reflecting surfaces are very small. Therefore, the irradiated ultraviolet rays 360 can reach the distal end portion of the optical operation element 2 while maintaining a sufficiently high intensity, thereby immediately setting the applied resin as a whole. Since the positioning state must be kept during setting of the resin, it is difficult to process a large number of optical modules. Therefore, it is very effective to shorten this processing time for improving the manufacturing efficiency. Note that reference numeral 370 in FIG. 24 denotes a condenser lens.

Although an ultraviolet-curing resin is used as the photo-setting resin 400 in the first embodiment, a resin which is set with any waveband other than an ultraviolet ray may be used.

In the first embodiment, the inner surface 320 of the element insertion hole 310 of the optical sleeve 5 is metallized with nickel. However, a metal to be used is not limited to nickel, and any metal such as gold can be used, provided that a mirror surface can be formed.

As has been described above, according to the present invention a hardening efficiency of, a photo-setting resin between the element insertion hole and the optical operation element is increased by metallizing the inner surface of the element insertion hole. The manufacturing efficiency can be greatly improved by shortening this resin setting time.

Next, the structure of a sleeve assembly in which an optical operation element 2 (3) can be adhered within a short period of time with a sufficient adhesive strength regardless of the material of a sleeve 5 (6) will be described.

Figure 25:
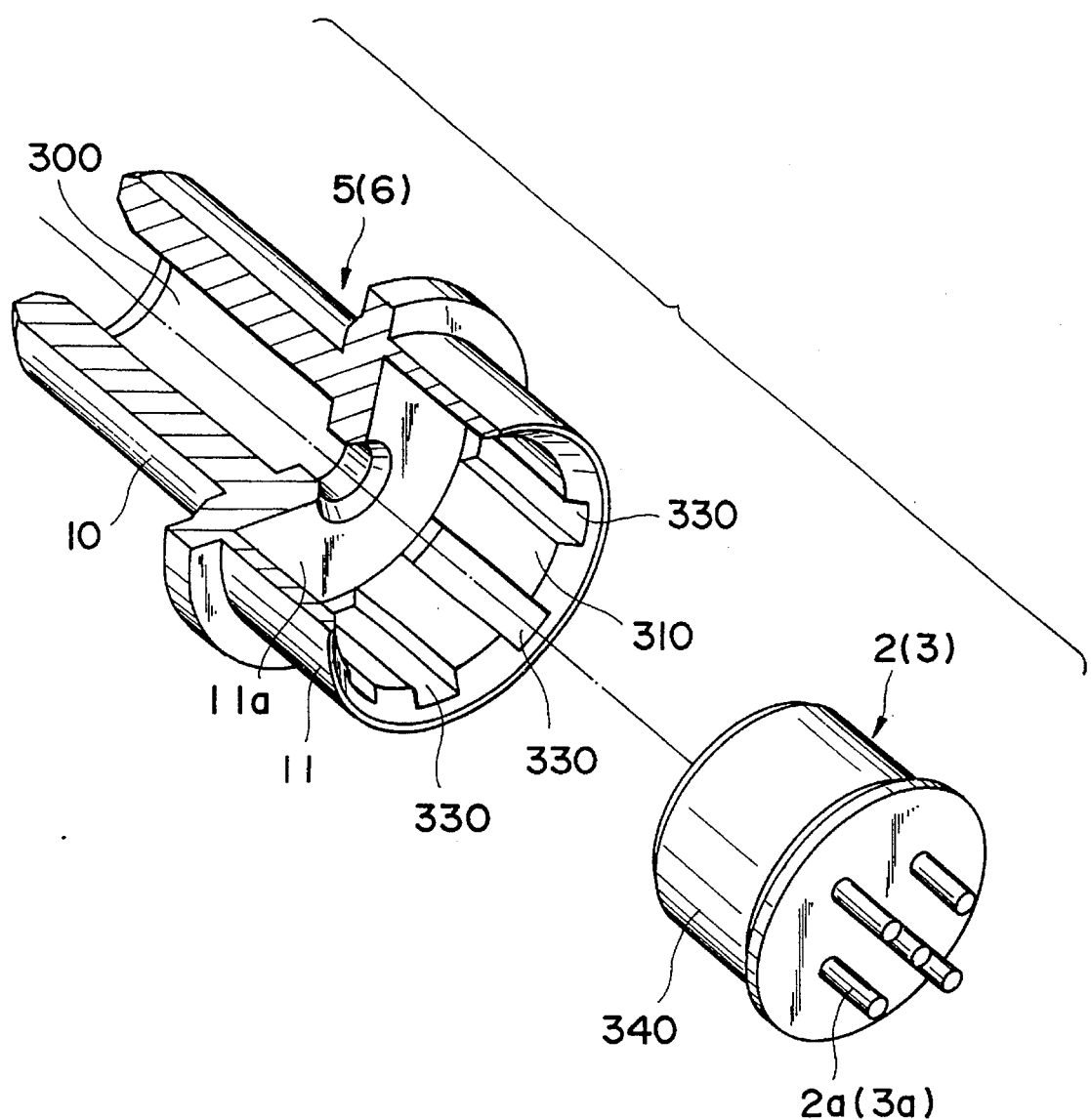
FIG. 25 is a partial sectional view showing the second embodiment of a combination of a sleeve and an optical operation element.

FIG. 25 is an enlarged partial sectional view showing the sleeve 5 (6) and the optical operation element 2 (3) before constituting the sleeve assembly. The sleeve 5 comprises a ferrule holding portion having a ferrule insertion hole 300 for storing a ferrule 9a arranged at the distal end of a connector plug 9, and an element holding portion having an element insertion hole 310 arranged to oppose the ferrule insertion hole 300. The element insertion hole 310 has a cylindrical inner wall (inner circumferential surface). A plurality of grooves 330 extending in the axis direction of the cylinder are formed in the inner wall of the element insertion hole 310. On the other hand, the optical operation element 2 has a cylindrical circumferential surface 340 having a diameter slightly smaller than that of the inner wall of the element insertion hole 310.

Figure 26:
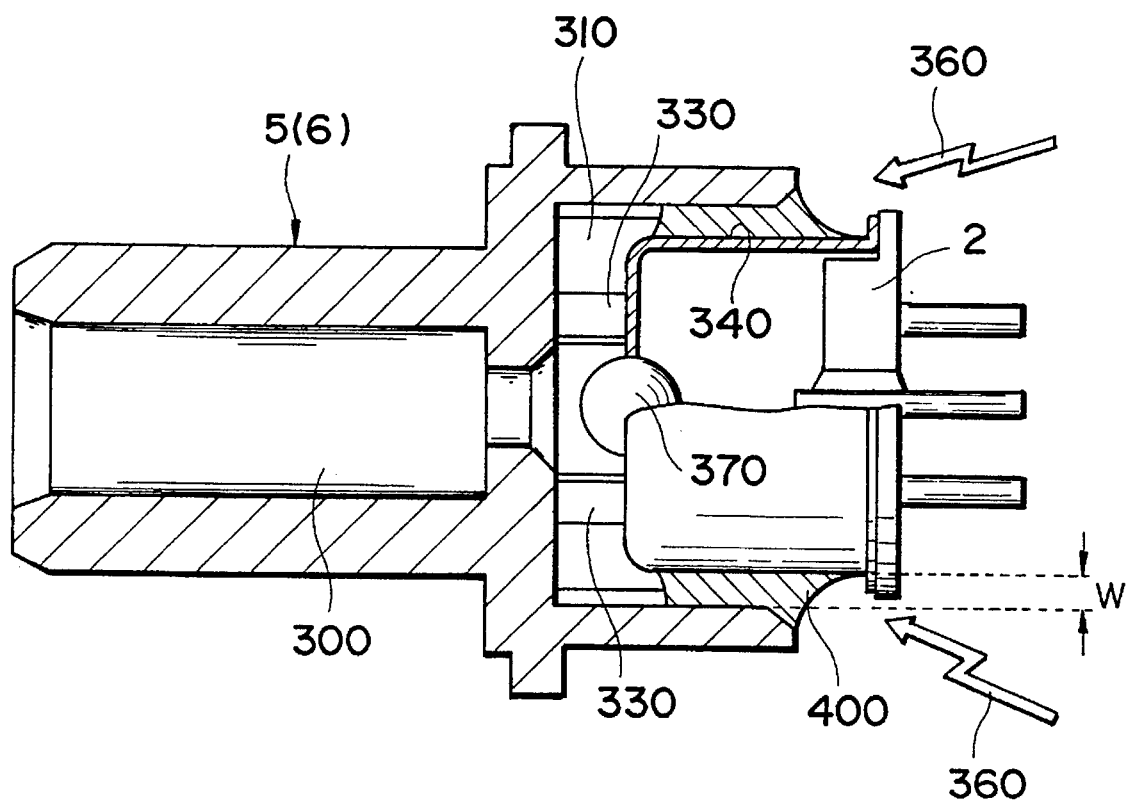
FIG. 26 is a sectional view for explaining the process for adhering and fixing the optical operation element in the sleeve shown in FIG. 24.

FIG. 26 is a sectional view showing the sleeve assembly obtained by inserting the optical operation element 2 in the element insertion hole 310 and filling an adhesive 400 therebetween. In FIG. 26, the section of the adhesive 400 in each groove 330 is illustrated. A thickness w of the adhesive 400 in each groove 330 is set to a value for passing the light sufficiently hardening the adhesive 400 therethrough. As a result, the joining strength between the optical operation element 2 and the element insertion hole 310 increases. The adhesive 400 of the second embodiment is an ultraviolet-curing resin. The adhesive 400 is applied to the outer circumferential surface of the optical operation element 2. After the optical operation element 2 is inserted in the element insertion hole 310, positioning (optical axis alignment) is performed. The resultant structure is irradiated with ultraviolet rays 360 from the rear gap to set the adhesive 400. Note that reference numeral 370 in FIG. 26 denotes a lens buried in the center of the upper portion of a lid for the optical operation element 2.

Figure 27:
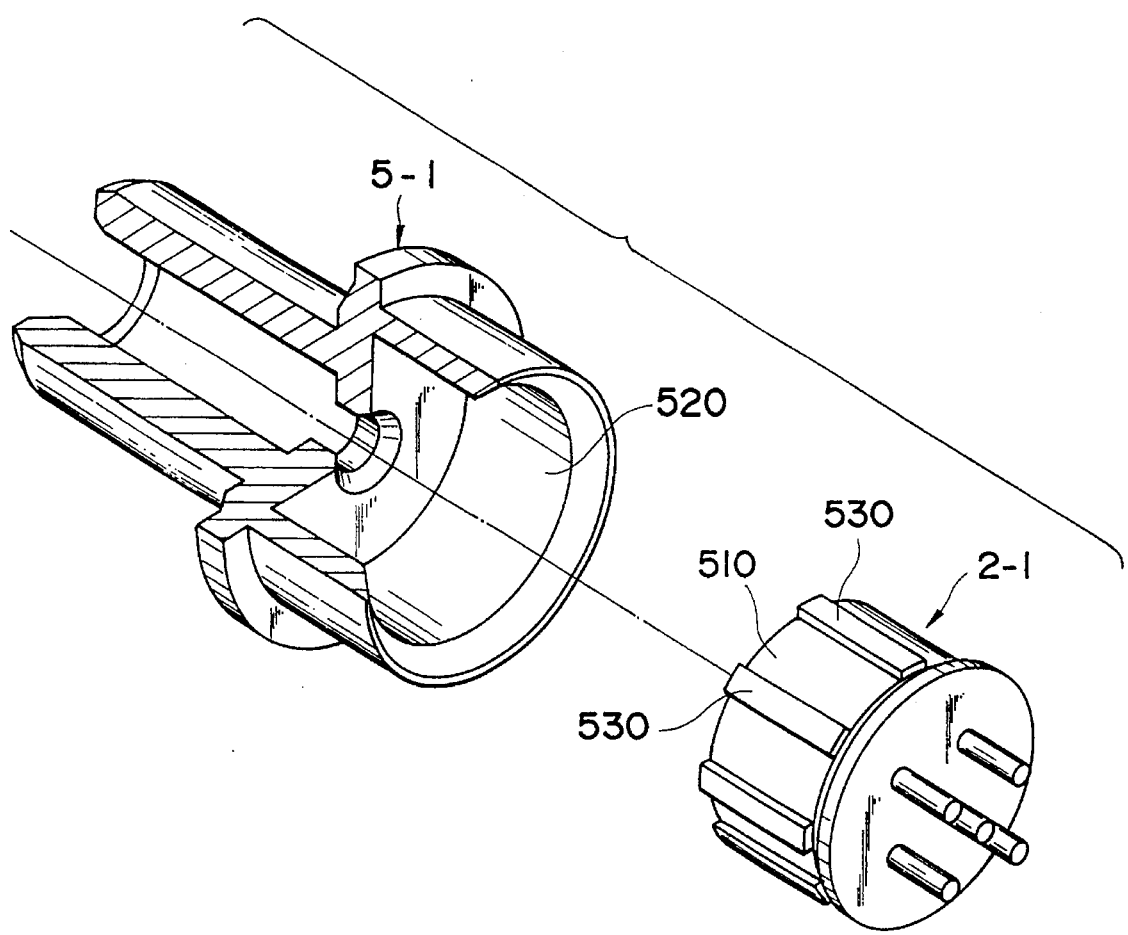
FIG. 27 is a partial sectional view showing the third embodiment of a combination of a sleeve and an optical operation element.

FIG. 27 is a partial sectional view showing the third embodiment of a sleeve and an optical operation element which constitute a sleeve assembly. The third embodiment is different from the first embodiment in that grooves 510 for increasing the joining strength of an adhesive 400 are formed in the outer circumferential surface of an optical operation element 2-1, and an element insertion hole 520 of a sleeve 5-1 has a cylindrical smooth inner wall. A plurality of projections 530 are arranged on the case surface, thereby defining the grooves 510 between the projections 530. With this arrangement, the adhesive 400 in each groove 510 has a sufficient thickness, as in the first embodiment. The thickness of the adhesive 400 in each groove 510 is larger than that without any groove. In the third embodiment, the width of each groove 510 formed in the outer circumferential surface of the optical operation element 2-1 is larger than the width of the remaining circumferential surface except for that of the groove 510. However, this ratio can be properly selected in accordance with a required joining strength.

Figure 28:
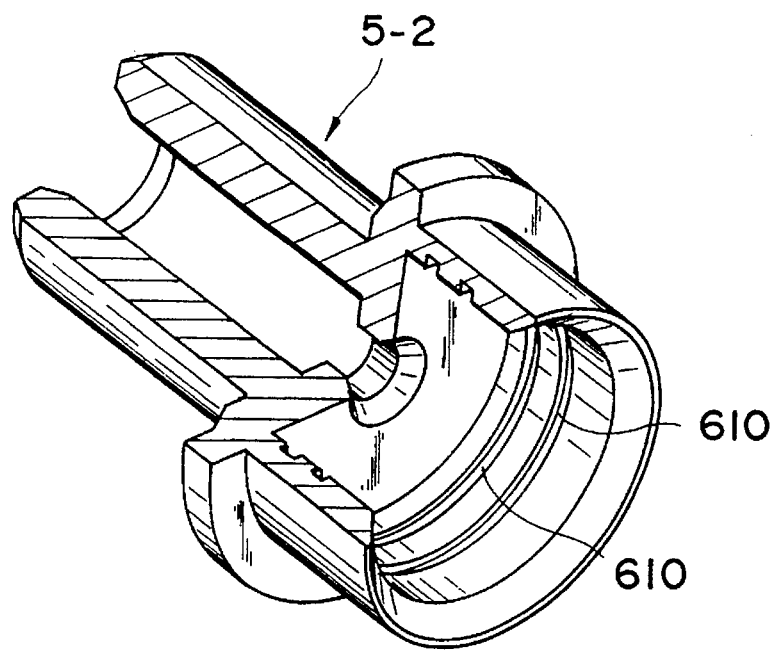
FIG. 28 is a partial sectional view showing an application of the sleeve shown in FIG. 25.

FIG. 28 shows a modification of the second embodiment in FIG. 25. In FIG. 25, the groove 330 formed in the element insertion hole 310 of the sleeve 5 extends in the optical axis direction. To the contrary, in this modification, grooves 610 are formed in the inner wall of a sleeve 5-2 in the circumferential direction. With this arrangement, the joining strength is increased on the basis of the same effect as in the above embodiments.

Figure 29:
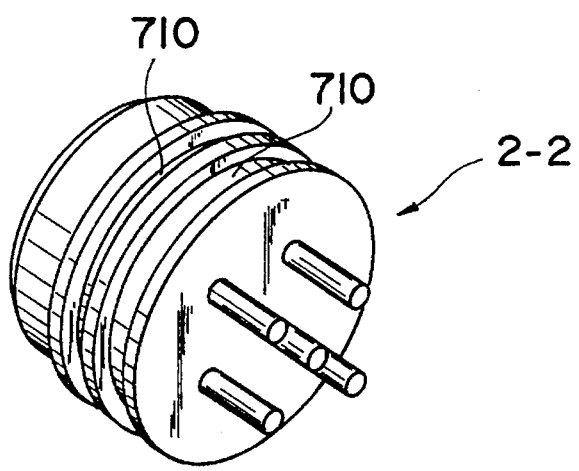
FIG. 29 is a perspective view showing an application of the optical operation element shown in FIG. 27.

FIG. 29 shows a modification of the third embodiment in FIG. 27. In FIG. 27, the groove 510 formed in the outer circumferential surface of the optical operation element 2-1 extends in the optical axis direction. To the contrary, in this modification, grooves 710 are formed in the outer wall of an optical operation element 2-2 in the circumferential direction. With this arrangement, the joining strength is increased, as in the third embodiment in FIG. 27.

Note that, all the grooves 330, 510, 610, and 710 in the above embodiments are linear. Instead of this shape, a spot-like recess may be formed in the outer circumferential surface of an optical operation element or the inner circumferential surface of the element insertion hole of a sleeve. That is, any one of the circumferential surface of the optical operation element and the inner circumferential surface of the element insertion hole of the sleeve may be recessed.

As has been described above, according to the present invention, any one of the inner circumferential surface of an element insertion hole and the outer circumferential surface of an optical operation element is recessed in the sleeve assembly. An adhesive filled in each recess of the corrugated surface becomes thick to obtain a sufficient joining strength. With this arrangement, durability to an external shock is increased, and the service life is also prolonged. Moreover, since the thick portions are partially formed, the amount of the adhesive can be minimized. A time required for setting the adhesive is shortened, and an assembly process is facilitated.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application Nos. 267391/1994 (6-267391) filed on Oct. 31, 1994, 275094/1994 (6-275094) filed on Nov. 9, 1994, and 19250/1995 (7-19250) filed on Feb. 7, 1995, are incorporated by reference.

What is claimed is:

1. An optical module comprising:

a sleeve having a first holding portion with an insertion hole being capable of accommodating a ferrule arranged at a distal end of an optical fiber, a second holding portion arranged to oppose said first holding portion and having an insertion hole for accommodating an optical operation element, and a flange arranged on an outer wall of said sleeve between said first and second holding portions and having first and second surfaces opposite to each other;

a circuit board electrically connected to a terminal extending from said optical operation element, said circuit board holding said optical operation element;

a housing having a cavity for accommodating said entire sleeve held by said circuit board, and a support portion, projecting from an inner wall of said housing, for fixing said sleeve at a predetermined position in the cavity, said support portion having a first reference surface abutting against said first surface of said flange of said sleeve; and a sleeve holder, attached to said housing, for fixing said sleeve at the predetermined position in the cavity of said housing together with said housing, said sleeve holder having a first spring piece abutting against said second surface of said flange of said sleeve to urge said first surface of said flange of said sleeve against said first reference surface.

2. A module according to claim 1, wherein said support portion of said housing further comprises a second reference surface, at least part of which abuts against said outer wall of said sleeve along said outer wall, and said sleeve holder further comprises a second spring piece which abuts against said outer wall of said sleeve to urge said sleeve against said second reference surface of said holder.

3. A module according to claim 1, wherein said circuit board comprises:

a flexible printed circuit electrically connected to said terminal extending from said optical operation element; and a plurality of plates which are physically independent from each other and respectively adhered to one surface of said flexible printed circuit, said optical operation element being mounted to one of said plates.

4. A module according to claim 3, wherein said flexible printed circuit is bent at a predetermined portion thereof, said predetermined portion being exposed without covering said plurality of plates.

5. A module according to claim 3, wherein said optical operation element is opposite to said flexible printed circuit through one of said plurality of plates, and a plurality of lead pins of said optical operation element are inserted in a plurality of through holes provided in said one of plates.

6. A module according to claim 3, wherein one of surfaces of said flexible printed circuit is grounded.

7. A module according to claim 1, wherein said flange of said sleeve has an outer diameter larger than a length from said first surface of said flange to a distal end of the fist holding portion of said sleeve.

8. A module according to claim 1, wherein said sleeve holder comprises a base portion for supporting said first and second spring pieces, said base portion has first latch portions on both sides, said housing has second latch portions, on side walls, corresponding to said first latch portions, and each of said second latch portions is engaged with a corresponding one of said first latch portions to attach said sleeve holder to said housing.

9. A module according to claim 1, wherein said housing further comprises a board support portion for defining a fixing position of said circuit board in the cavity, and a hook piece for attaching said circuit board to said housing.

10. A module according to claim 1, wherein said sleeve essentially consists of a plastic material.

11. A module according to claim 10, wherein said sleeve comprises a metal film formed on an inner wall of the insertion hole of the second holding portion thereof.

12. A module according to claim 1, wherein said sleeve comprises a plurality of grooves on an inner wall of the insertion hole of the second holding portion thereof.

13. A module according to claim 12, wherein said optical operation element has a plurality of projections on an outer wall of a case thereof.

14. A module according to claim 1, wherein said optical operation element has a plurality of projections on an outer wall of a case.

15. A module according to claim 1, wherein said housing further comprises a third spring piece, and said third spring piece abuts against said second surface of said flange of said sleeve to urge said first surface of said flange of said sleeve against said first reference surface.

16. A module according to claim 1, wherein said sleeve comprises a plurality of grooves on an inner wall of the insertion hole of the second holding portion thereof, and said optical operation element has a plurality of projections on an outer wall of a case thereof.

* * * * *